(12) United States Patent
White et al.

(10) Patent No.: US 12,423,332 B1
(45) Date of Patent: Sep. 23, 2025

(54) ENHANCED DISTRIBUTED RETRIEVAL AUGMENTED GENERATION SYSTEM

(71) Applicant: Dell Products L.P., Round Rock, TX (US)

(72) Inventors: William Jeffery White, Plano, TX (US); Xin Ma, Pflugerville, TX (US); George Currie, Canyon Lake, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/963,965

(22) Filed: Nov. 29, 2024

Related U.S. Application Data

(60) Provisional application No. 63/691,160, filed on Sep. 5, 2024.

(51) Int. Cl.
  *G06F 16/00* (2019.01)
  *G06F 16/28* (2019.01)
(52) U.S. Cl.
  CPC .................... *G06F 16/285* (2019.01)
(58) Field of Classification Search
  CPC .......................................... G06F 16/285
  USPC .......................................... 707/739
  See application file for complete search history.

(56) References Cited

U.S. PATENT DOCUMENTS

| | | | |
|---|---|---|---|
| 2024/0386015 A1* | 11/2024 | Crabtree | G06F 16/9024 707/707 |
| 2025/0156898 A1* | 5/2025 | Crabtree | G06Q 30/0277 707/707 |
| 2025/0217671 A1* | 7/2025 | Denis | G06N 7/01 707/707 |

* cited by examiner

*Primary Examiner* — Alexandria Y Bromell
(74) *Attorney, Agent, or Firm* — Chamberlain, Hrdlicka, White, Williams & Aughtry; Aly Z. Dossa

(57) ABSTRACT

The disclosure describes an enhanced distributed retrieval augmented generation (RAG) system. The enhanced distributed RAG system provides RAG data to a local small foundation system to form prompts. The enhanced distributed RAG system creates local query optimized representations (QORs) that are matched with queries sent to the local small foundation system to create prompts. The enhanced distributed RAG system is located on one edge site and is connected to the global federated RAG module. The global federated RAG system is connected to other enhanced distributed RAG systems in other edge sites. QORs can be distributed across the enhanced distributed RAG systems and the global federated RAG module by promoting local QORs to global QORs and vice versa.

20 Claims, 26 Drawing Sheets

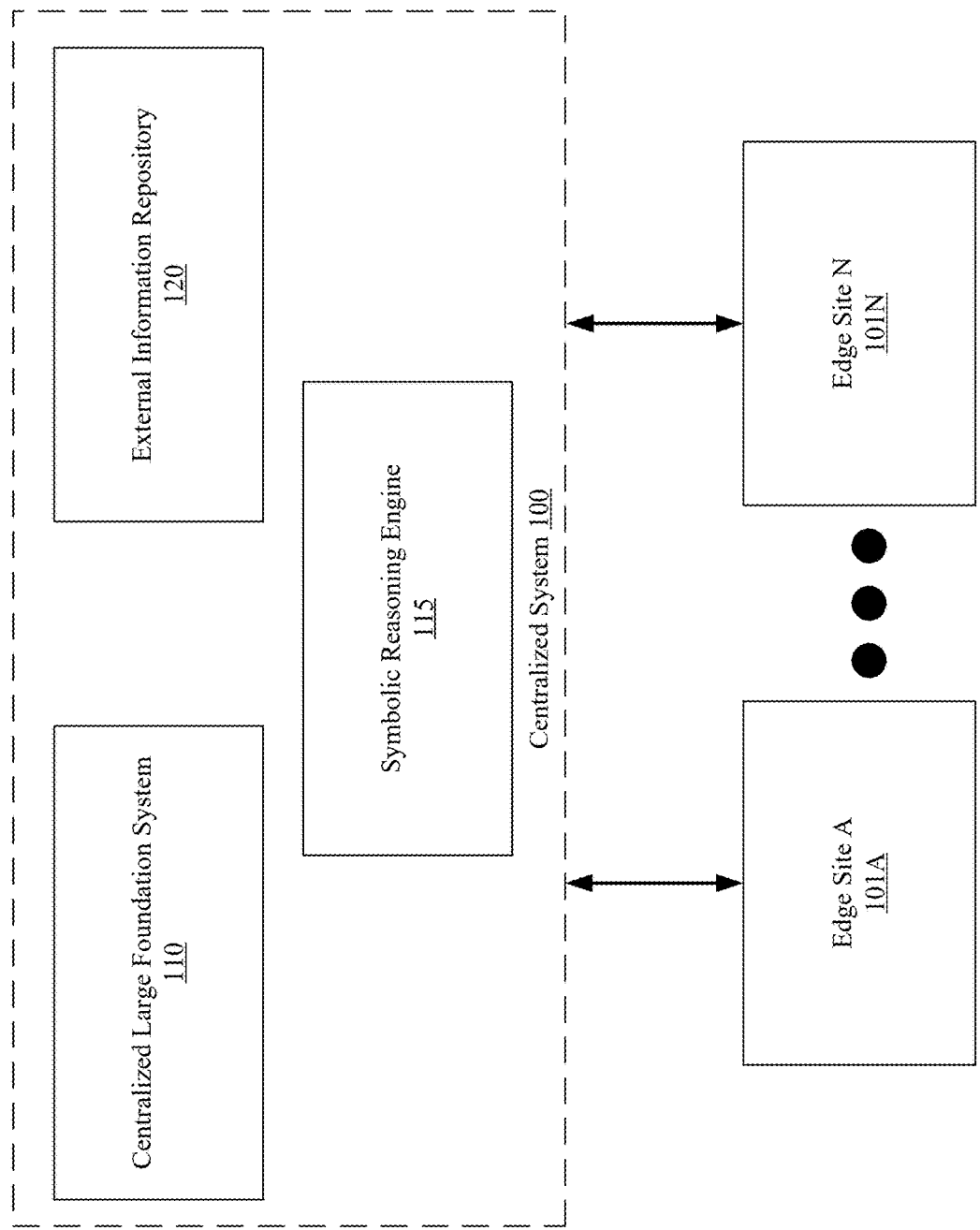
FIG. 1.1

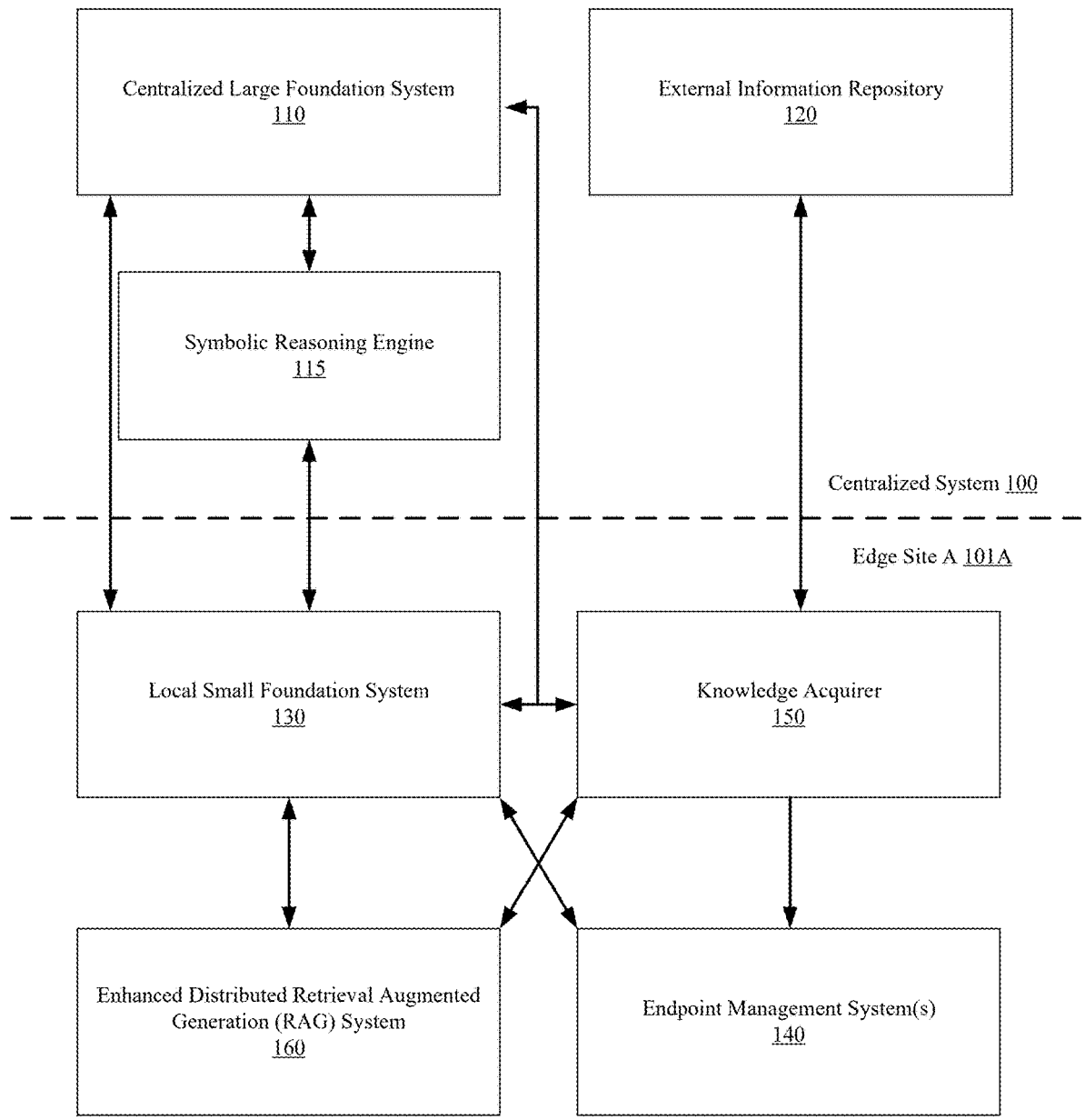
FIG. 1.2

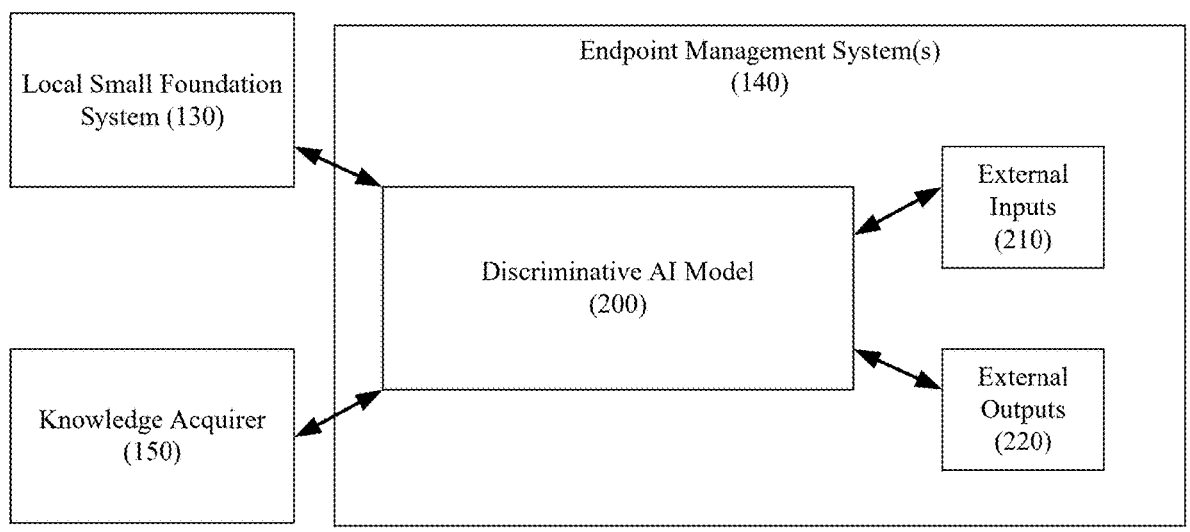
FIG. 2.1

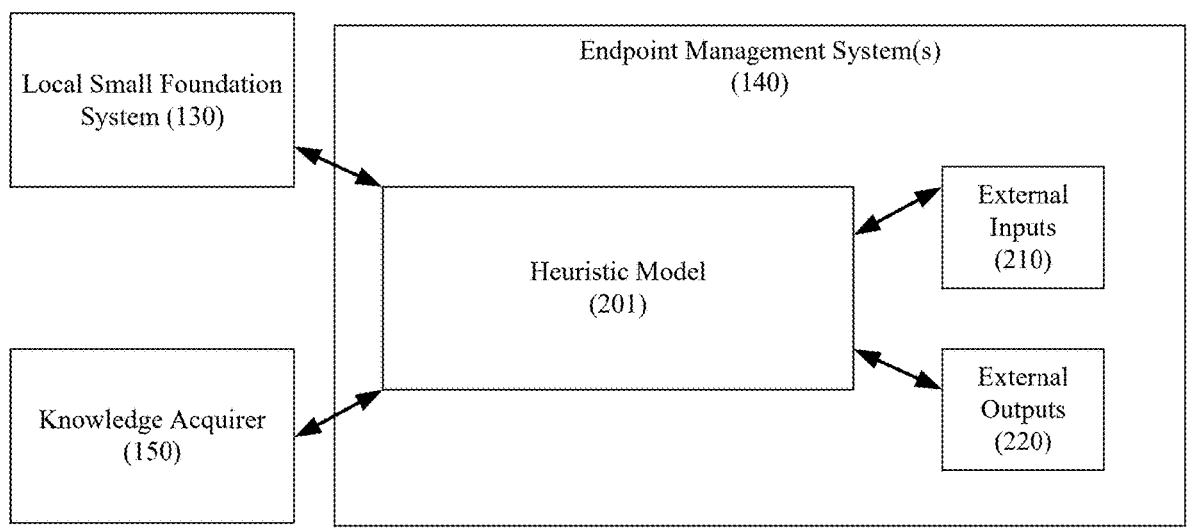
FIG. 2.2

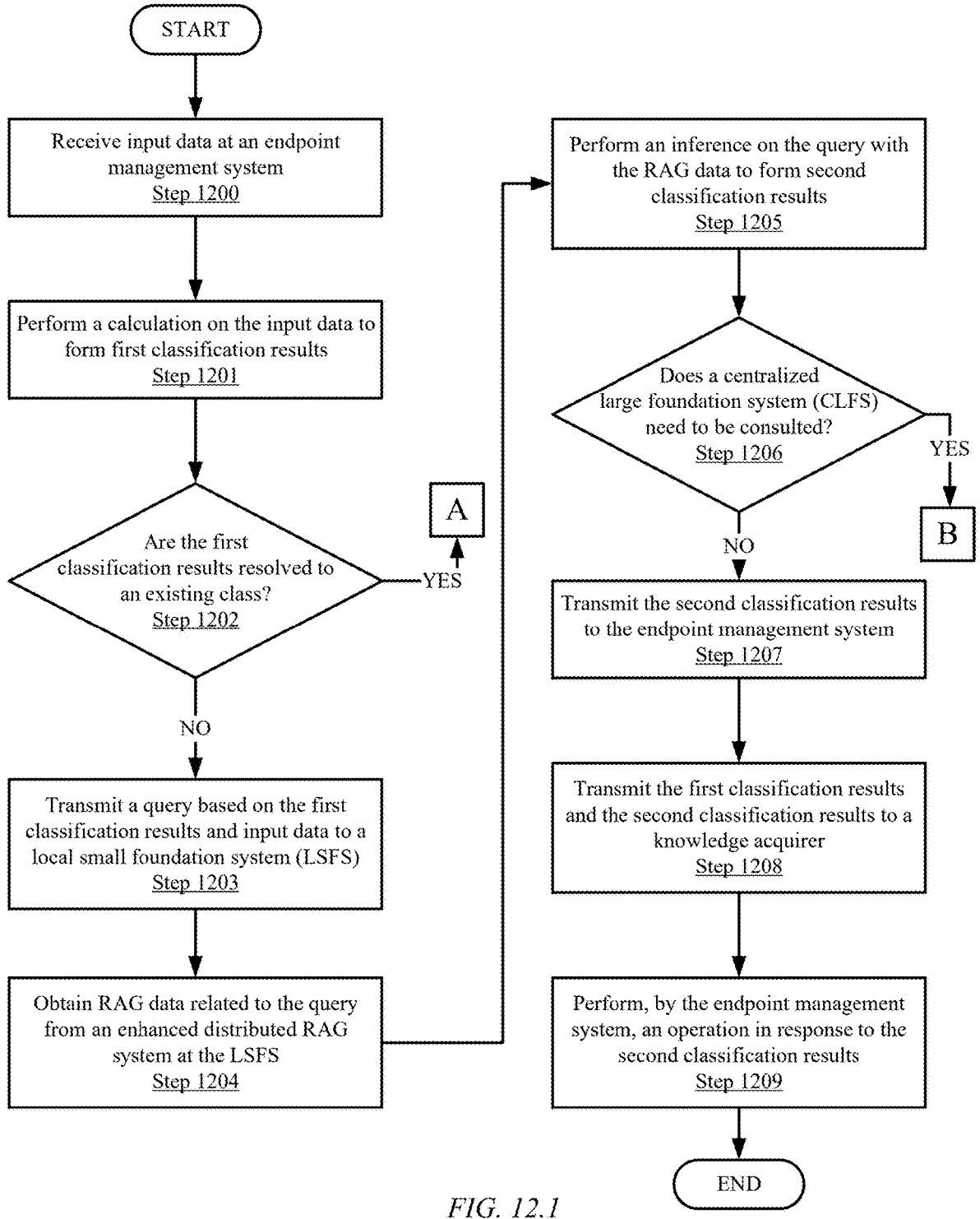
FIG. 12.1

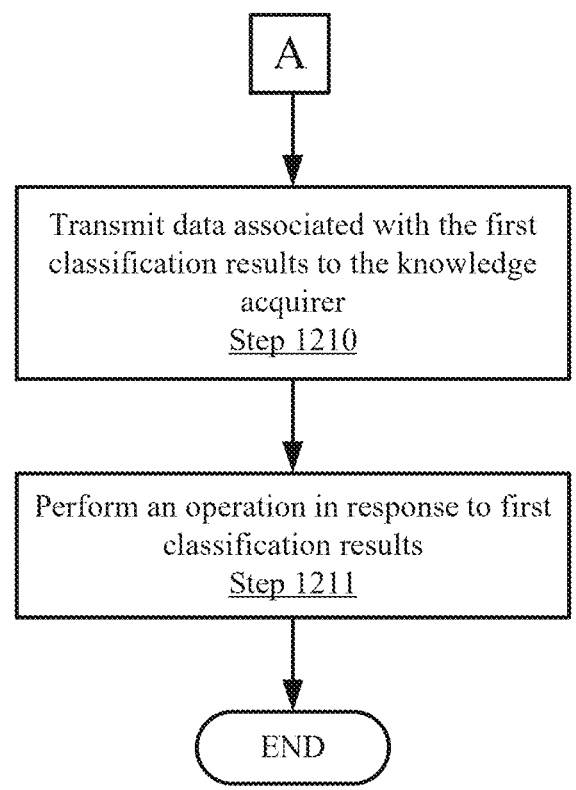
FIG. 12.2

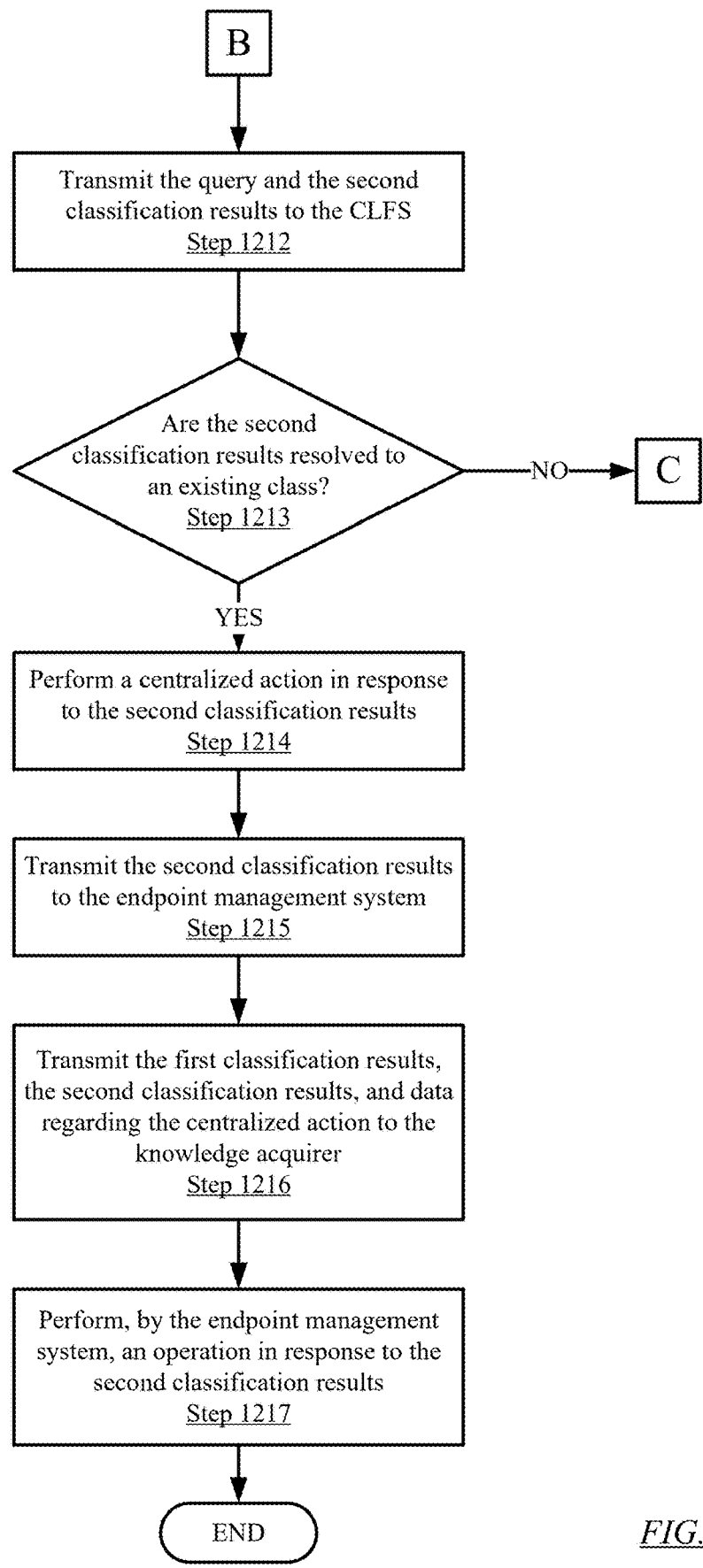
FIG. 12.3

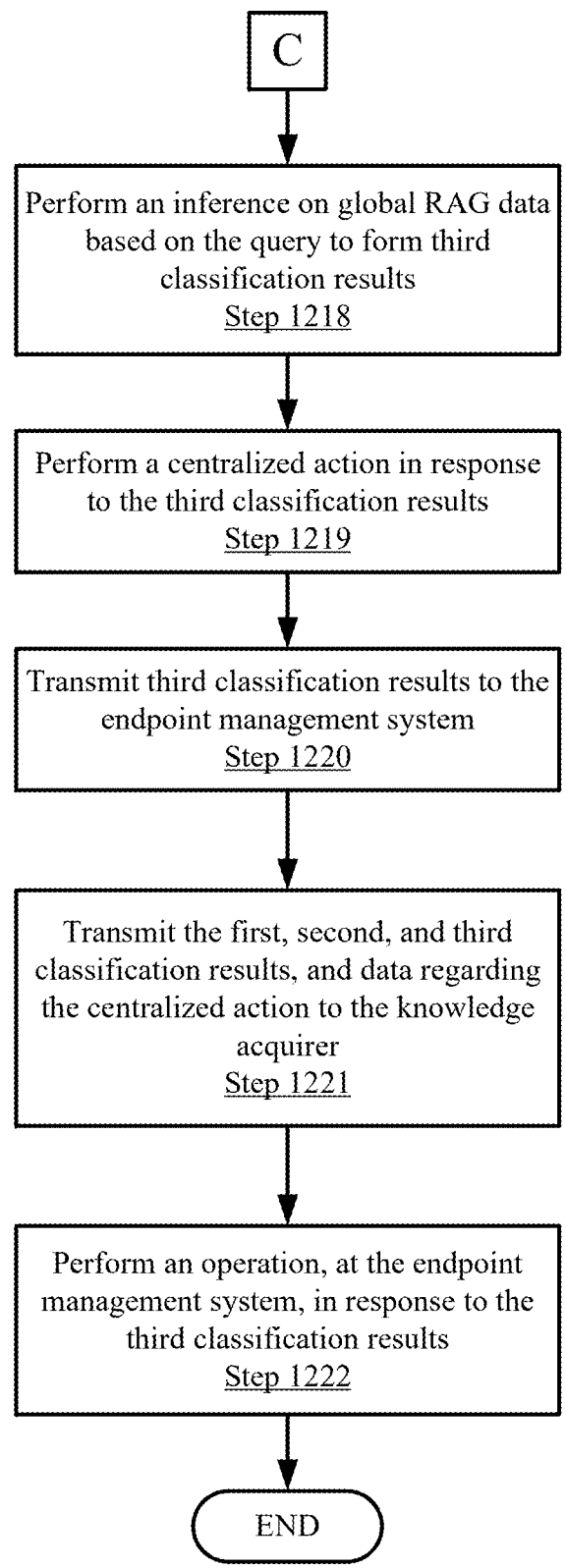
FIG. 12.4

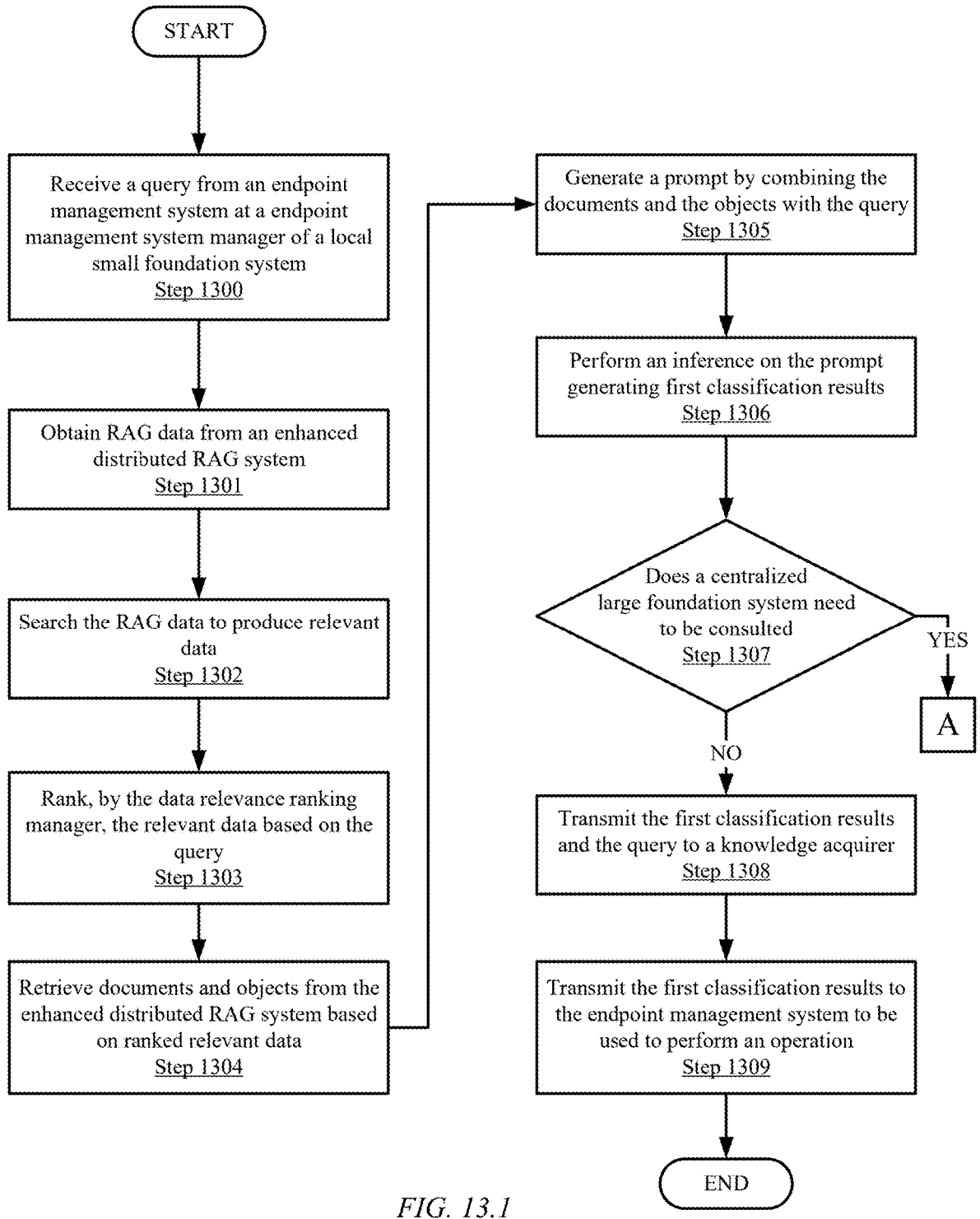
FIG. 13.1

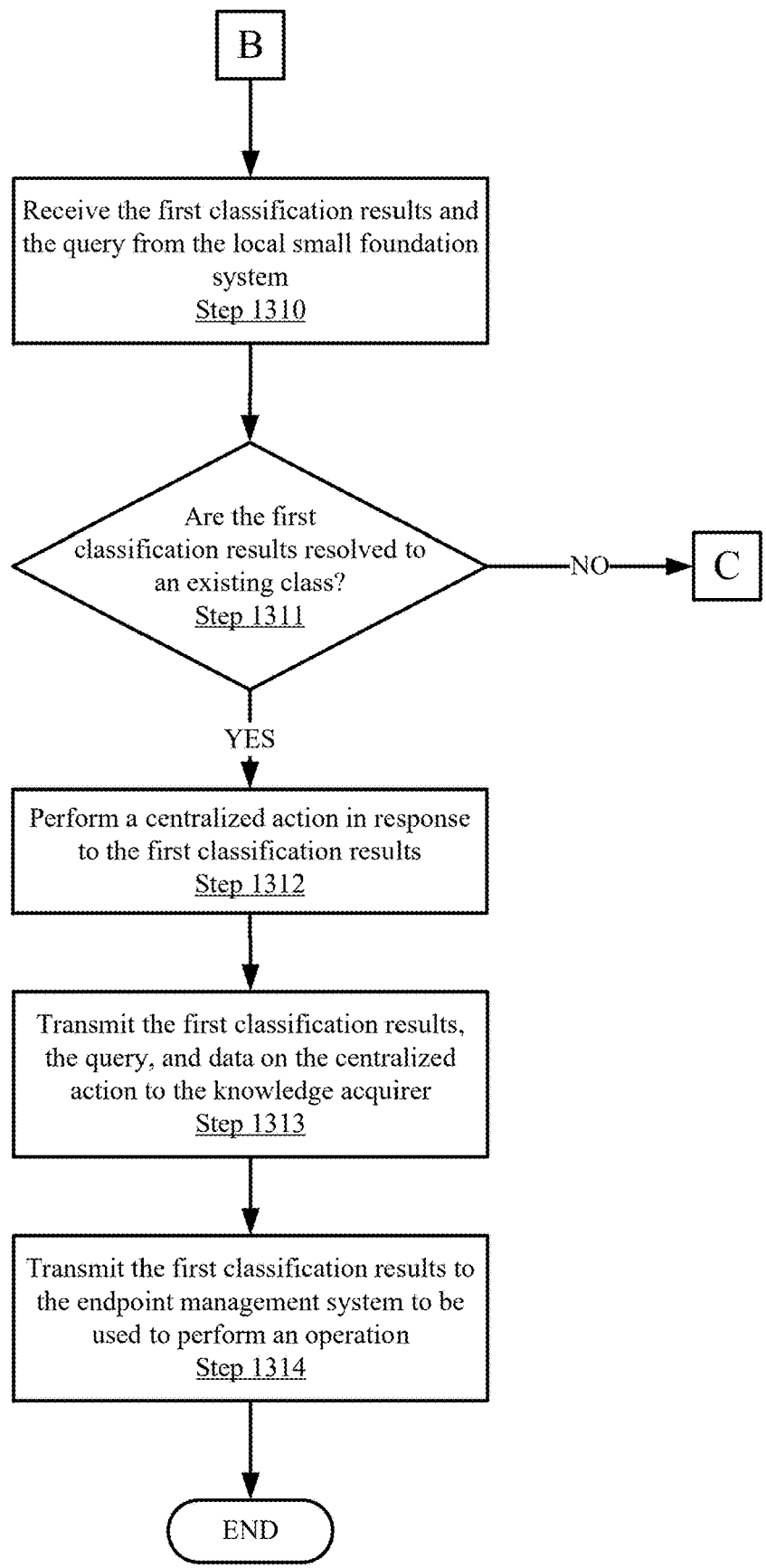
FIG. 13.2

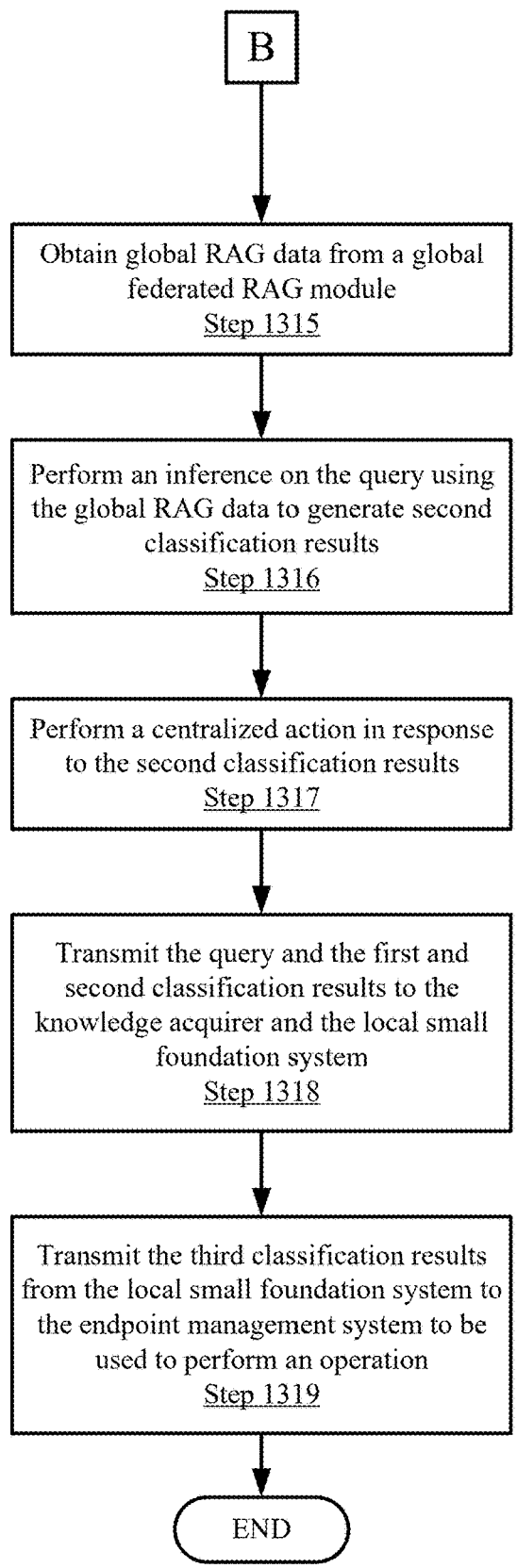
FIG. 13.3

ENHANCED DISTRIBUTED RETRIEVAL AUGMENTED GENERATION SYSTEM

CROSS-REFERENCE TO RELATED APPLICATIONS

This application claims the benefit of U.S. Provisional Application No. 63/691,160, filed on Sep. 5, 2024, and titled "HYBRID DISTRIBUTED INFERENCE OPERATIONS." U.S. Provisional Application No. 63/691,160 is hereby incorporated herein by reference.

BACKGROUND

Artificial Intelligence (AI) use in industry continues to rise. Discriminative AI systems have been widely deployed and are best used in limited state spaces where a training dataset can accurately describe the complete scenario. These systems have issues when used when the training dataset cannot describe the complete scenario. Generative AI systems offer a superior ability to generalize to data not in a training set but have drawbacks including hallucinations (i.e., inaccurate outputs), and the large number of parameters needed.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an edge site and a centralized system in accordance with one or more embodiments of the invention.

FIG. 2.1 shows a diagram of an endpoint management system using a discriminative artificial model in accordance with one or more embodiments of the invention.

FIG. 2.2 shows a diagram of an endpoint management system using a heuristic model in accordance with one or more embodiments of the invention.

FIGS. 12.1-12.4 show a flowchart for a method for generating an inference with an artificial intelligence hybrid distributed system in accordance with one or more embodiments of the invention.

FIGS. 13.1-13.3 show a flowchart of a method for generating an inference with a local small foundation system in accordance with one or more embodiments of the invention.

DETAILED DESCRIPTION

Figure 3:
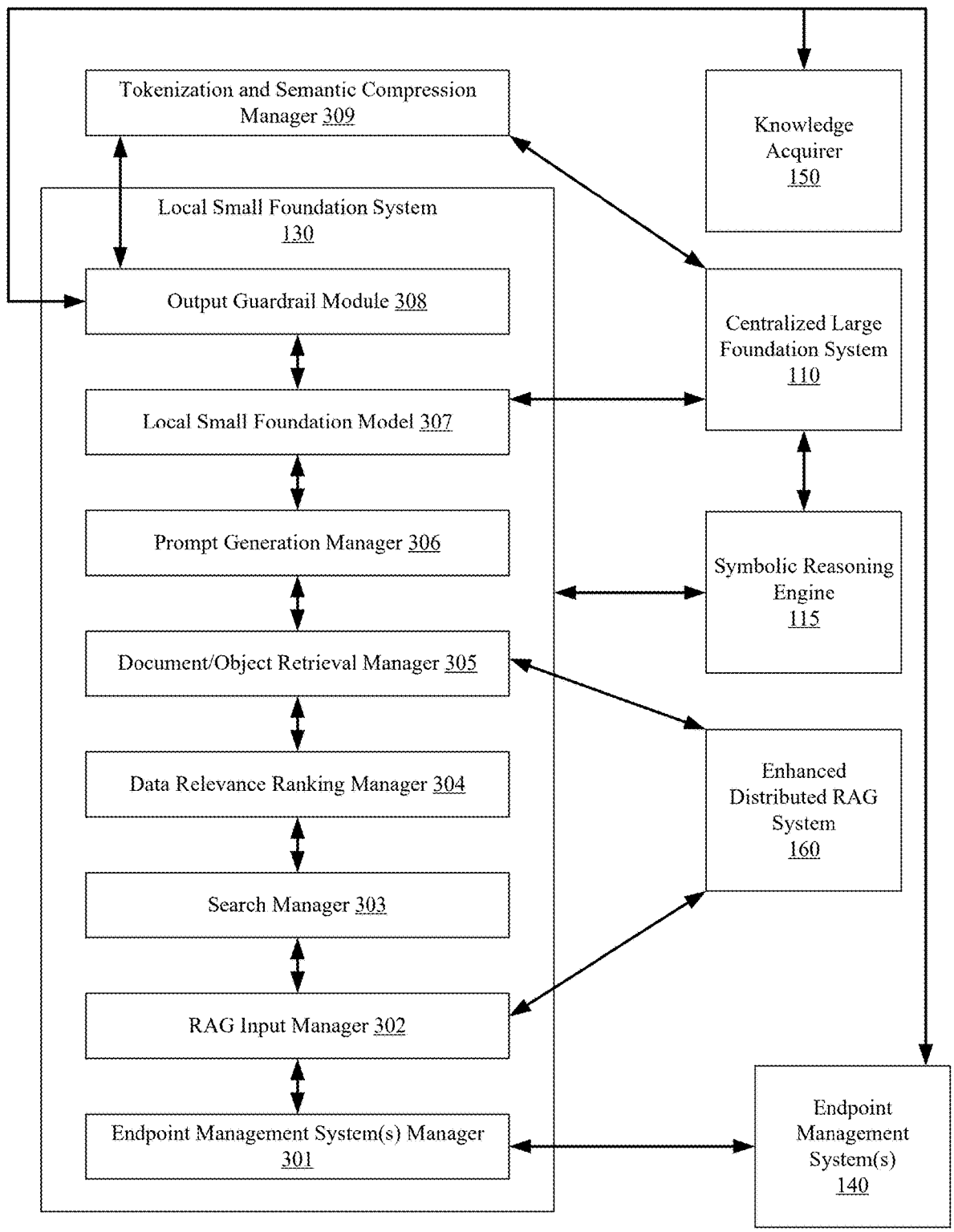
FIG. 3 shows a diagram of a local small foundation system in accordance with one or more embodiments of the invention.

In general, embodiments of the invention relate to systems, devices, and methods for leveraging an artificial intelligence (AI) hybrid distributed inference system (see e.g. FIGS. 1.1-1.2). The AI hybrid distributed inference system uses discriminative AI systems (see e.g., FIG. 2.1) and generative AI systems (see e.g., FIGS. 3-4). The AI hybrid distributed inference system is implemented across a centralized system and a plurality of distributed edge sites (see e.g. FIGS. 1.1-1.2). In some embodiments, the distributed edge sites (also referred to as local sites) may correspond, but are not limited to, one or more distributed locations (e.g., factories, retail stores, logistic work centers, etc.,). The edge sites may correspond to other geographically distributed locations and/or physical infrastructure without departing from the invention. The edge sites communicate with a centralized system and can communicate with other edge sites through the centralized system.

More specifically, various embodiments of the invention embodiments of the invention allow for discriminative AI systems (e.g., endpoint management system in FIG. 2.1) and heuristic models (e.g., endpoint management system in FIG. 2.1) to be used to make classifications at the level of sensors receiving input data in the edge sites (e.g. an endpoint management system connected to a camera over an assembly line and making classifications based on the images of a product from the camera). If the classifications made by the discriminative AI systems or heuristic models are not satisfactory (or otherwise within an acceptable threshold), generative AI systems are then used to make classifications. In various embodiments, the classifications at the edge sites are made using a local small foundation system, which uses less parameters than larger systems makes a classification (see e.g. FIG. 3). In certain scenarios, a centralized large foundation system may be used to make classifications at the centralized system, where the centralize large foundation system uses more parameters than the local small foundation system (see e.g. FIG. 4). Returning the classification performed by the local small foundation system, the local small foundation system may use retrieval augmented generation (RAG) data to make classifications. The RAG data is formed by an enhanced distributed RAG system (see e.g. FIG. 5). Knowledge acquirers are used to transform data created from the local small foundation system into useable training data (see e.g., generally in FIG. 6, RAG knowledge acquirer in FIG. 7, and distributed learning knowledge acquirer in FIG. 8). A symbolic reasoning engine is used to distribute variables from the centralized large foundation system to local small foundation systems on various edge sites (see e.g., FIG. 9). A digital twin system assists the distributed learning knowledge acquirer by ranking data that is ultimately as used for training the discriminative AI systems (see e.g. FIG. 10). An external information repository is located on the centralized system to capture data from systems of the plurality of local sites (see e.g., FIG. 11).

Using the aforementioned architecture, embodiments of the invention enable classifications to be performed on input data received at the edge site using the least amount of computer resources possible. Said another way, an attempt is made to classify the input data using discriminative AI model or a heuristic model. If that is successful, an operation is performed in response to the classification. If it fails, an attempt is made to classify the input data locally using a small generative AI system via the local small foundation model. If that is successful, an operation is performed in response to that classification. If this second attempt fails, an attempt is made to classify the input data at the centralized system using a large generative AI system via the centralized large foundation system. If that is successful, an operation is performed in response to that classification. Accordingly, in various embodiment of the invention, the centralized large foundation system is only used if the local small foundation system fails to properly classify the input data and the local small foundation system is only used if the endpoint management system fails to properly classify the input data (see e.g., FIGS. 12.1-12.4).

Figure 17:
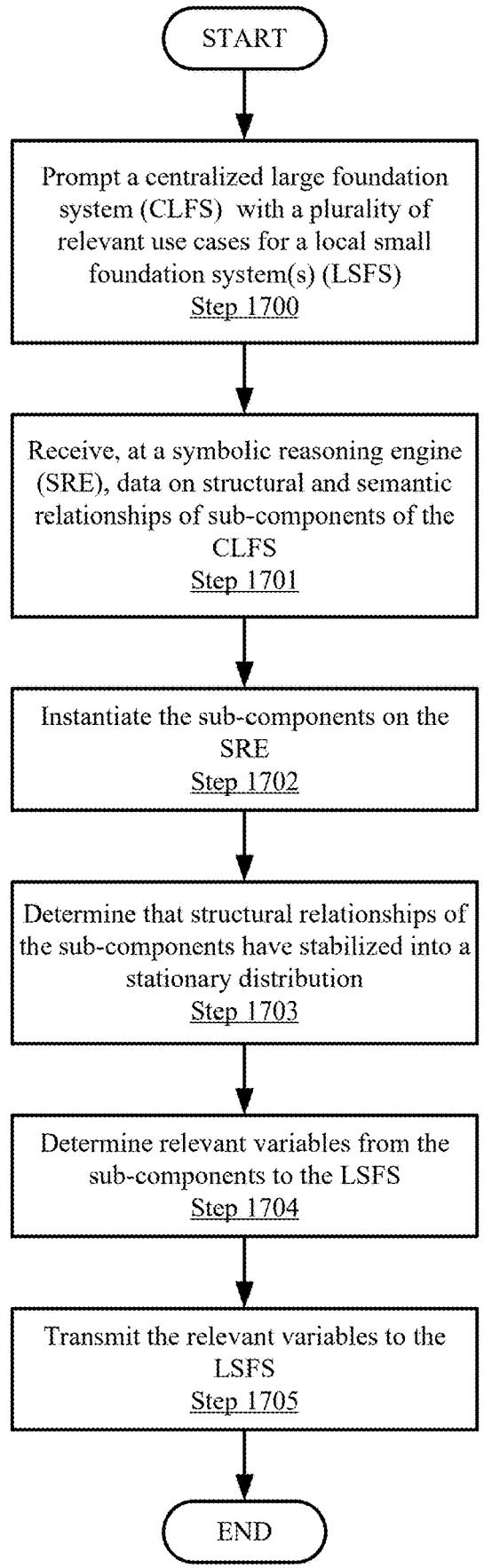
FIG. 17 shows a flowchart of a method for creating a local discriminative model in accordance with one or more embodiments of the invention.
Figure 18:
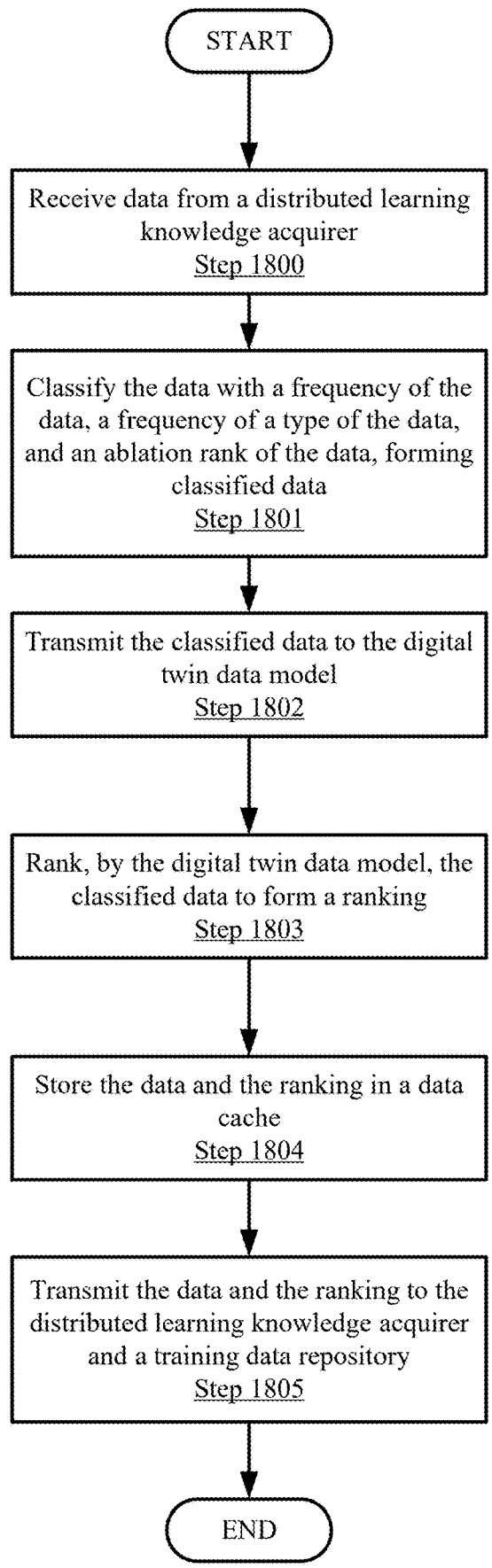
FIG. 18 shows a flowchart of a method for creating a local discriminative model in accordance with one or more embodiments of the invention.

Further, in various embodiments of the invention, the aforementioned architecture may implement one or more of the following additional features (each of which may be used in conjunction with any combination of the other features): creating classifications in the local small foundation system (see e.g., FIGS. 13.1-13.3), creating query optimized representations in the enhanced distributed RAGs (see e.g., FIG. 14), creating enterprise data with the RAG knowledge acquirer (see e.g., FIG. 15), creating discriminative AI models with the distributed learning knowledge acquirer (see e.g., FIG. 16), refining the local small foundation system using the symbolic reasoning engine (see e.g., FIG. 17), and ranking data for the distributed learning knowledge acquirer by the digital twin system (see e.g. FIG. 18).

FIG. 1.1 shows a diagram of a system in accordance with one or more embodiments of the invention. The system includes a centralized system (100) and one or more edge sites (101A,101N). The one or more edge sites may include edge site A (101A) and edge site N (101N) and any other number of other edge sites. The edge sites (101A, 101N) are further described with reference to edge site A (101A) in FIG. 1.2. All edge sites (101A) are operatively connected to the centralized system (100). The centralized system (100) may also include a centralized large foundation system (110), a symbolic reasoning engine (115), and an external information repository (120).

The system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 1.1 may be connected via a network fabric (not shown). A network fabric refers to the interconnected topology and structure of network elements, e.g., switches, routers, and links, which work together to provide data transmission within between the components. The network fabric may be implemented using a spine-leaf topology, where every leaf switch connects to each spine switch. Those skilled in the art will appreciate that any other type of network (or network topology) may be used without departing from the invention.

Each of these components shown in FIG. 1.1 is described below.

Figure 4:
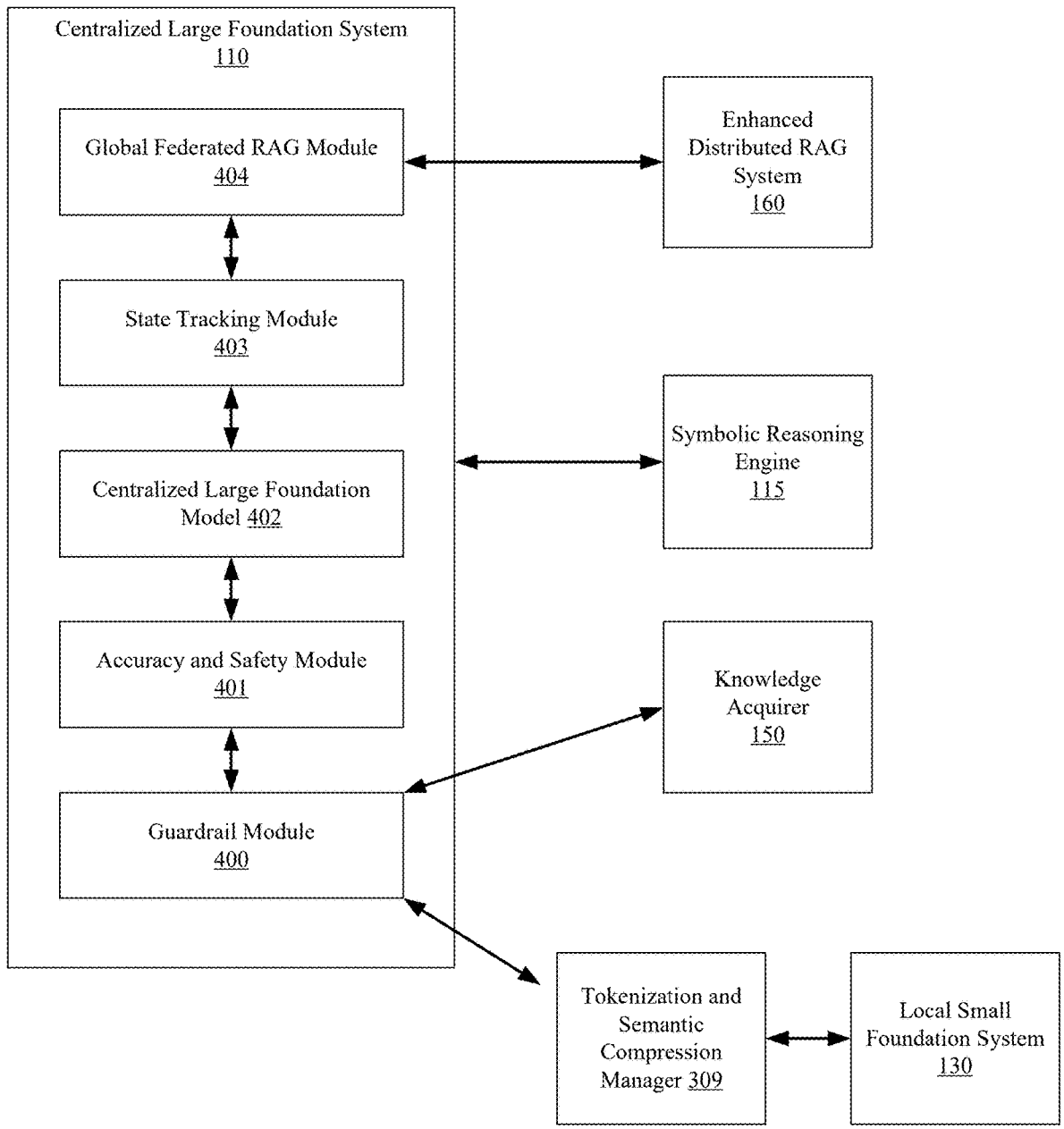
FIG. 4 shows a diagram of a centralized large foundation system in accordance with one or more embodiments of the invention.

The centralized large foundation system (110) includes a generative artificial intelligence (AI) model to make inferences on data and is further described in FIG. 4. The symbolic reasoning engine (115) is described in FIG. 9. The external information repository (120) is described in FIG. 11.

The centralized system (100) may be located in a data center sufficiently large to provide the computational power needed for the centralized system (100).

Figure 19:
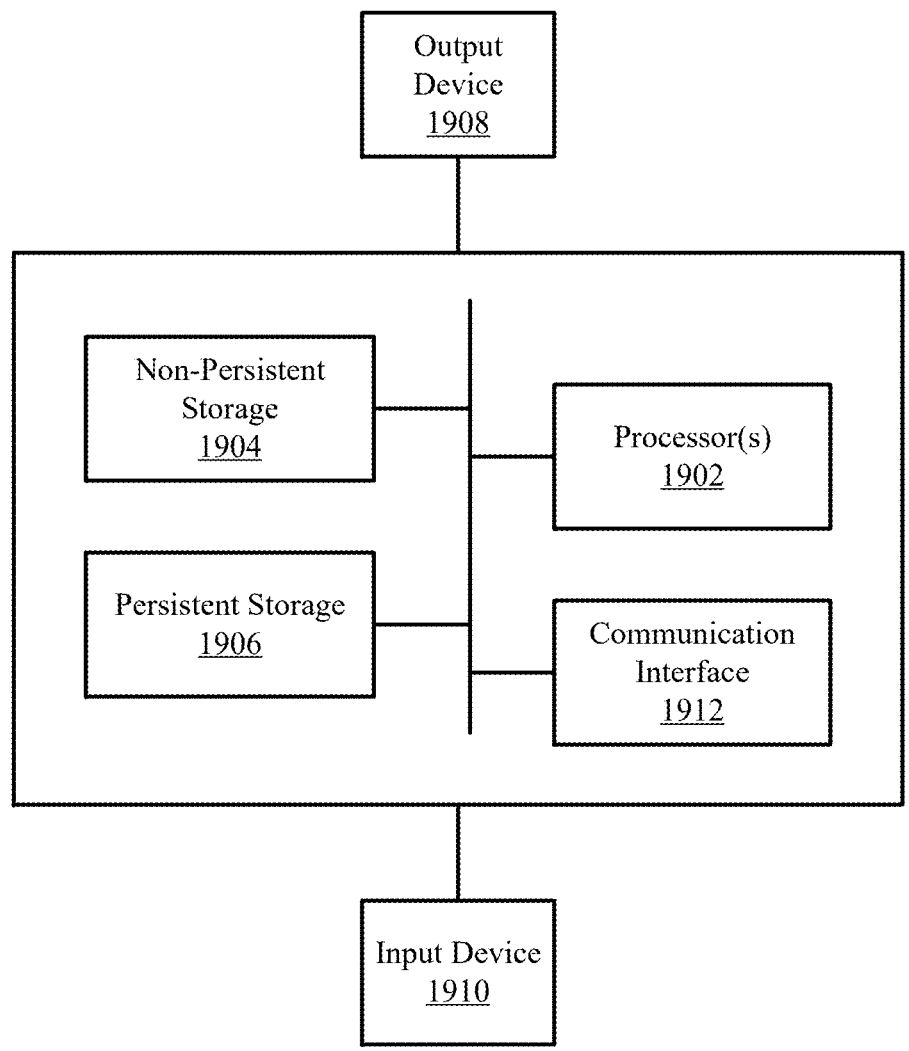
FIG. 19 shows a diagram of a computer in accordance with one or more embodiments of the invention.

In one or more embodiments of the invention, the centralized system (100) may be implemented as one or more computing devices (see e.g., FIG. 19). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the centralized system (100) described throughout this application and/or all, or a portion thereof, of the methods illustrated in FIGS. 12.1-18.

In one or more embodiments of the invention, the centralized system (100) is implemented as a logical device(s) (e.g., a virtual machine and/or an includeer). Each logical device may utilize the computing resources of any number of computing devices and thereby provide the functionality of the centralized system (100) described throughout this application and/or all, or a portion thereof, of the methods illustrated in FIGS. 12.1-18.

The edge site(s) (101A) are distributed locations at the edge of a network where data is generated. The edge sites are distributed. The edge site(s) allows for processing the data at the local location it is collected as opposed to sending it to a central location such as the centralized system (100). The edge site (101A) includes a sensor and data processing systems as shown below in FIG. 1.2. The edge site (101A) corresponds to a physical location (e.g., a factory, an assembly line of a factory, a distributed location etc.) and is operatively connected to the centralized system (100). For example, a car manufacture may have a one or more factories to manufacture cars. The car manufacture has a data center that hosts the centralized system (100). The car manufacture has multiple factories where each of the factories is an edge site.

In one or more embodiments of the invention, the edge site(s) (101A) may be implemented as one or more computing devices (see e.g., FIG. 19). The computing device(s) may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the edge site(s) (101A)

described throughout this application and/or all, or a portion thereof, of the methods illustrated in FIGS. 12.1-18.

In one or more embodiments of the invention, the edge site(s) (101A) is implemented as a logical device. The logical device may utilize the computing resources of any number of computing devices and thereby provide the functionality of the edge site(s) (101A) described throughout this application and/or all, or a portion thereof, of the methods illustrated in FIGS. 12.1-18.

FIG. 1.2 shows a diagram of the edge site A (101A) and the centralized system (100) in accordance with one or more embodiments of the invention. The edge site A (101A) includes a local small foundation system (130), an endpoint management system(s) (140), a knowledge acquirer (150), and an enhanced distributed retrieval augmented generation (RAG) system (160). The local small foundation system (130) is operatively connected to the knowledge acquirer (150), the endpoint management system (140), and the enhanced distributed RAG system (160). The knowledge acquirer (150) is also operatively connected to the endpoint management system (140) and the enhanced distributed RAG system (160). In the centralized system (100), the external information repository (120) is operatively connected to the knowledge acquirer (150). The centralized large foundation system (110) is operatively connected to the local small foundation system (130) and the knowledge acquirer (150). The edge site may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 1.2 may be connected via a network fabric (not shown). Each of these components shown in FIG. 1.2 is described below.

The local small foundation system (130) includes a generative artificial intelligence (AI) model to make inferences on data. The local small foundation system (130) is further described in FIG. 3.

The endpoint management system (140) is described in FIGS. 2.1-2.2. The endpoint management system (140) may be one of a plurality of distributed endpoint management system (not shown).

The knowledge acquirer (150) collects data from the local small foundation system (130) and the centralized large foundation system (110) and transforms the data to be useful for the endpoint management system(s) (140) and the enhanced distributed RAG system (160). The knowledge acquirer (150) is further described in FIGS. 6-8, and 10.

The enhanced distributed RAG system (160) is a RAG system used to provide RAG data to the local small foundation system (130). The enhanced distributed RAG system (160) is further described in FIG. 5.

Returning to the example of the car manufacture above, one edge site (101A) may be located at one factory. This allows for the local small foundation system (130), the endpoint management system (140), the knowledge acquirer (150), and the enhanced distributed retrieval augmented generation (RAG) system (160) to locally process the data produced in that factory leading to a reduction in time and the ability for these systems to be tailored to the factory on which they are located.

FIG. 2.1 shows a diagram of the endpoint management system (140) using a discriminative AI model (200) in accordance with one or more embodiments of the invention. The endpoint management system (140) includes the discriminative AI model (200), external inputs (210), and external outputs (220). The endpoint management system (140) is on the edge of the edge site (101A). The external inputs (210) may, for example, correspond to sensors and other instruments connected directly to the factory (or systems therein) that provide data on the factory described below. In some embodiments, the edge site (100A) has multiple endpoint management systems (140) where each endpoint management system (140) corresponds to a sensor in the edge site. The endpoint management system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 2.1 may be connected via a network fabric (not shown). Each of these components shown in FIG. 2.1 is described below.

The external inputs (210) may be any sensor that generates data from the edge site. The external inputs (210) may come in a wide variety of capabilities and types and include cameras (of all types of resolution and frame rates for visual stimulus), acoustic sensors (for detecting sound patterns), pressure sensors, flow meters, sensors for voltage/current, or any other type of sensor. The external inputs (210) collect environmental information for the endpoint management system (140) and operators of the edge site. The information gathered from the external inputs (210) is formed into input data. The input data may address various issues in an edge site such as defects in manufactured goods, reduction in inventory, reduction in production rate, and repairs needed in manufacturing equipment.

The discriminative AI model (200) leverages discriminative AI to make inferences to classify the input data. The discriminative AI model (200) may be any suitable discriminative AI model such as a convolution neural network. In some embodiments the discriminative AI model is a residual neural network, a type of convolution neural network. When the input data are images, "you only look once" image discriminative AI model may be used. Those skilled in the art will appreciate that the invention is not limited to the aforementioned examples; rather, any known or later discovered discriminative AI model may be used without departing from the invention. The discriminative AI model (200) includes the functionality to determine if the classification of the input data is correct using a filter(s). The filter(s) determines if the classification can produce an instruction that will answer the problem within a threshold of accuracy. The discriminative AI model (200) is operatively connected to the local small foundation system (130) to send the input data and the attempted classification as a query if the classification by the discriminative AI model fails. The discriminative AI model reduces the input data to just the issue that needs to be resolved prior and includes this reduced input data in a query that is sent to the local small foundation system (130), thereby reducing the amount of data to be sent and simplifying the issue that the local small foundation system (130) needs to resolve. The discriminative AI model (200) is operatively connected to the external outputs (220) to send instructions on how to respond to the input data. These instructions can be formed in the discriminative AI model (200) when the classification is successful or passed through the discriminative AI model (200) from the local small foundation system (130) when the discriminative AI model cannot make the classification.

The external outputs (220) perform an operation on the edge site based on instructions formed in response to a classification made in the edge site (101A). As described above, the instructions can come from the discriminative AI model (200) or the local small foundation system (130). The external outputs may include, e.g., actuation controllers such as programmable logic controllers, control relays, calibration systems, controllers that directly control processes in the faction (i.e., conveyor control speed, etc.).

Included in the external inputs (210) and the external outputs (220) are user interfaces that provide logs, exception reporting, and allow for external user control of the endpoint management system (140).

FIG. 2.2 shows a diagram of the endpoint management system (140) using a heuristic model (201) in accordance with one or more embodiments of the invention. The endpoint management system (140) includes the heuristic model (201), the external inputs (210), and the external outputs (220). The external inputs (210) and the external outputs (220) are the same as for FIG. 2.2. The endpoint management system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 2.2 may be connected via a network fabric (not shown). Each of these components shown in FIG. 2.2 is described below.

In some embodiments, the discriminative AI model is replaced by the heuristic model (201) in the endpoint management system. The heuristic model (201) performs like the discriminative AI model (200) but uses a heuristic model (i.e. a method used to approximate a correct classification without using AI). Whether using the discriminative AI model (200) or the heuristic model (201), the endpoint management system (140) is may be configured to operate in the true positive portion of classification results. Accordingly, if there is a likelihood that the classification may be a false negative or a false positive, then the endpoint management system sends a query (described above) to the local small foundation system (130).

With respect to both FIGS. 2.1 and 2.2, in one or more embodiments of the invention, the endpoint management system (140) may be implemented as one or more computing devices (see e.g., FIG. 19). The computing device(s) may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the endpoint management system (140) described throughout this application and/or all, or a portion thereof, of the methods illustrated in FIGS. 12.1-18.

In one or more embodiments of the invention, the endpoint management system (140) is implemented as a logical device. The logical device may utilize the computing resources of any number of computing devices and thereby provide the functionality of the endpoint management system (140) described throughout this application and/or all, or a portion thereof, of the methods illustrated in FIGS. 12.1-18.

FIG. 3 shows a diagram of the local small foundation system (130) in accordance with one or more embodiments of the invention. The local small foundation system uses generative AI to classify the query sent from the endpoint managements system (140). The easy cases (true positives) are handled at the endpoint management system (140). Using generative AI, the hard cases (potential false positives and potential false negatives) are handled at the local small foundation system (130). The generative AI allows for generalization complementing the discriminative AI model's and/or the heuristics model's weaknesses leading to a higher accuracy. In one embodiment of the invention, the local small foundation system (130) includes less than 10 billion parameters and is located locally on the edge site A (101A). The local small foundation system (130) is located on the edge site (101A) which allows the local small foundation system (130) to be customized to the edge site (101A). This optimizes the performance of the local small foundation system (130) to produce the correct classifications for the edge site (101A) while maintaining a relatively small generative AI model.

The local small foundation system (130) includes an endpoint management system(s) manager (301), the RAG input manager (302), the search manager (303), the data relevance ranking manager (304), the document/object retrieval manager (305), the prompt generation manager (306), the local small foundation model (307), and the output guardrail module (308). The local small foundation system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 3 may be connected via a network fabric (not shown). Each of these components shown in FIG. 3 is described below.

The endpoint management system(s) manager (301) receives a query along with the related data from an endpoint management system (140). The endpoint management system(s) manager (301) is connected to one or more endpoint management systems (140) located on the edge site (101A). The endpoint management system(s) manager (301) sends a query (including the related data) to the RAG input manager (302). The RAG input manager (302) retrieves query optimized representations (QORs) (which is part of the RAG data) that are relevant to the query from the enhanced distributed RAG system (160). In one embodiment of the invention, a QOR is a transformed and structured version of a query designed to enhance the precision and relevance of results from a knowledge base or document repository. This representation often involves converting the query into semantic embeddings using advanced language models, which encode the underlying meaning of the query in a format suitable for efficient vector-based retrieval. It may also incorporate contextual enrichment, domain-specific language, or optimization techniques like query expansion to align closely with the structure and content of the indexed data.

The RAG input manager (302) first searches a local database including local QORs. If the local QORs are not sufficient, the RAG input manager (302) searches a global database for global QORs. The global database is connected to a global federated RAG module (404). In some embodiments, the RAG input manager (302) searches the local database and the global database at the same time as a quality check on the global federated RAG module (404) and the enhanced distributed RAG system (160) as further described in FIG. 5. The RAG input manager (302) may also search a web database for web QORs. QORs are further described in FIG. 5.

The query and the QORs are sent to the search manager (303) and the data relevance ranking manager (304). Both the search manager (303) and the data relevance ranking manager (304) further rank the QORs with respect to the query. The search manager (303) and the data relevance ranking manager (304) determine if the provided QORs are sufficient to form a prompt. The ranked QORs are used to determine relevant data to the query. The relevant data is sent to the document/object retrieval manager (305). The document/object retrieval manager (305) retrieves documents and objects from the enhanced distributed RAG system (160) that form the QORs determined to be relevant data.

The documents and the objects are sent from the document/object retrieval manager (305) to the prompt generation manager (306). The prompt generation manager (306) uses the documents, the objects, and sometimes the query to form a prompt to classify the original problem from the external inputs (210). The prompt is then used as an input of the local small foundation model (307). The local small foundation model (307) generates a local classification result as an output. The local classification result is sent to the output guardrail module (308).

The output guardrail module (308) performs several tasks including determining if the local classification result is resolved to an existing class of a set of existing classes. A set of example illustrative examples is shown below:
Discriminative AI-CNN_CLASSES ['Component-Missing', 'Misalignment', 'Connection-Fail', 'Orientation-Fail', 'Structure Defect', 'Discoloration', 'Seal-Fail', 'Incorrect-Component', 'PASS', 'NULL']. The output guardrail module (308) also determines if the local classification results correctly and completely addresses the problem (e.g., if the classification provides a class that is one of the classes in the set of classes but its valid classification based on the heuristics implemented in the output guardrail module) (see e.g., FIGS. 12.1-12.4). If the local classification results correctly and completely address the problem, the output guardrail module (308) crafts instructions and sends the instructions to the endpoint management system(s) (140). If the local classification results cannot correctly or completely address the problem, the output guardrail sends the prompt, the query, and the local classification results to the tokenization and semantic compression manager (309) to be sent to the centralized large foundation system (110). The centralized large foundation system (110) can also be used to perform a centralized task that cannot be completed at the edge site (101A) (i.e., ordering inventory). The output guardrail module (308) may employ a whitelist and a blacklist of results to ensure the local classification result are correct especially due to the chance of false positive and false negative errors. This is described below in FIGS. 12.1-12.4

In one embodiment, the local classification results are in a resource description framework format. More specifically, the RDF is a standard model for describing resources in a structured and machine-readable format. It represents information as triples, consisting of a subject (the resource being described), a predicate (the property or relationship), and an object (the value or target). These triples form a graph-based structure that enables linking and integration of data across different systems. RDF uses Uniform Resource Identifiers (URIs) to uniquely identify resources and properties, ensuring global interoperability. It can be serialized in various formats, making it versatile for applications like knowledge graphs, semantic web technologies, and linked data. The RDF format output from local small foundation system illustrative example is shown below:
 <prefixes:
  rdf: "https://www.w3.org/1999/02/22-rdf-syntax-ns #"
  schema: "https://schema.org/"
  dc: "https://dublincore.org/specifications/dublin-core/dcmi-terms/"
 resources:
  model: "https://vi-assembly-line_cnn.model
   id: "vi-assembly-m07-1"
   type-class: "output class"
   properties:
  predicate:
   subject: "output class"
    action: "correct/dispose/replace/pass"
  object:
   vi-image: "schema.org/ImageObject"
    prompt: "RCA-class"
   newdomain: "yes;no"
   directive: <string up to 128 chars>
 >

The output guardrail module (308) uses rules to validate proper format. After the format is validated, the action is validated to determine if it is permissible. For example, if a routing classification (e.g., moving the product to the next manufacturing step) is permissible, the action of deactivating the process would not be allowed. Most importantly, the output guardrail module (308) changes which rule is used for validation based on context. Context is based on the heuristic model (201) or the discriminative model (200) which changes potential object directives. In addition, if the local small foundation system (130) or the output guardrail module (308) detect a sequential set of failures the directive can be to stop the process associated with the input data The output guardrail module (308) monitors the query and QORs used and ensures that the output from the local small foundation model (307) is appropriate. The output guardrail module (308) may be implemented using a small foundation model.

A tokenization and semantic compression manager (309) is located between the local small foundation system (130) and the centralized large foundation system (110). The tokenization and semantic compression manager (309) receives the query and local classification results from the output guardrail module (308). The token and semantic compression manager (309) is a portion of the centralized large foundation system (110) that is distributed to all of the edge sites (101A). The query and local classification results destined for the centralized large foundation system (110) is tokenized, compressed and embedded. This relieves the centralized large foundation system (110) from this computation and improving latency by reducing the amount of data transmitted. The embedded representation is created in the tokenization and semantic compression manager (309). The tokenization and semantic compression manager (309) determines and index to embedded representation. The tokenization and semantic compression manager (309) and centralized large foundation system (110) use the same embedding algorithm and database cache/representation. The tokenization and semantic compression manager (309) sends a token comprising a way to identify the query and the local classification results versus sending the prompt, the query, or the objects and documents. This results in a semantic compression without the need to pass the prompt, the query, or the objects and documents, the tokenization and semantic compression manager (309) sends the index to embedded representation resulting in a potentially significant reduction of data required to be transmitted. If the index cannot be matched by the centralized large foundation system (110), the centralized large foundation system (110), then in response to this determination by the centralized large foundation system, the tokenization and semantic compression manager (309) retrieves and sends the prompt, the query and needed objects and documents.

In one or more embodiments of the invention, the local small foundation system (130) may be implemented as one or more computing devices (see e.g., FIG. 19). The computing device(s) may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the local small foundation system (130) described throughout this application and/or all, or a portion thereof, of the methods illustrated in FIGS. 12.1-18.

In one or more embodiments of the invention, the local small foundation system (130) is implemented as a logical device. The logical device may utilize the computing resources of any number of computing devices and thereby provide the functionality of the local small foundation system (130) described throughout this application and/or all, or a portion thereof, of the methods illustrated in FIGS. 12.1-18.

FIG. 4 shows a diagram of the centralized large foundation system (110) in accordance with one or more embodiments of the invention. The centralized large foundation system (110) is located in the centralized system (100) and is therefore connected to all local small foundation systems (130) located in the various edge sites (101A, 101N). The centralized large foundation system (110) may be used to form central classification results when the local classification results are wrong and can also be used to perform centralized actions (i.e. ordering inventory). The centralized large foundation system (110) may have over a hundred billion parameters. The centralized large foundation system (110) implements a generative AI model that is similar to the local small foundation system (130). However, the difference between the two is that the centralized large foundation system (110) is larger, having at least ten times the number of parameters compared to the local small foundation system (130), and centralized. Further, unlike the local small foundation system (130), the centralized large foundation system (110) is not customized to an edge site (101A) leading it to be more generalized in assisting in complex use cases (i.e. multi-objective optimization, synthetic data generation, etc.). In one or more embodiments, the aim of the distributed hierarchical model architecture is that the centralized large foundation system (110) is intended to be used least often, i.e., only for the most complex use cases. The centralized large foundation system (110) may optionally provide suggestions to the local small foundation system (130) for follow up instructions which can assist the function of the output guardrail module (308). The centralized large foundation system (110) provides the suggestions through global RAG data federated to the enhanced distributed RAG system (160) and responses to the output guardrail module's (308) requests for centralized actions and central classification results.

The centralized large foundation system (110) includes a guardrail module (400), an accuracy and safety module (401), a centralized large foundation model (402), a state tracking module (403), and the global federated RAG module (404). The centralized large foundation system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 4 may be connected via a network fabric (not shown). Each of these components shown in FIG. 4 is described below.

The guardrail module (400) operates like the output guardrail module (308) but also handles incoming data from the tokenization and semantic compression manager (309). The global federated RAG module (404) and the accuracy and safety module (401) assist in generating the input to the centralized large foundation model (402). The centralized large foundation model (402) is a generative AI model and generates the central classification results. The guardrail module (400) is configured to transmit the central classification results to the output guardrail module (308). The state tracking module (403) is configured to perform centralized tasks received from the output guardrail module (308).

In one or more embodiments of the invention, the centralized large foundation system (110) may be implemented as one or more computing devices (see e.g., FIG. 19). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the centralized large foundation system (110) described throughout this application and/or all, or a portion thereof, of the methods illustrated in FIGS. 12.1-18.

In one or more embodiments of the invention, the centralized large foundation system (110) is implemented as a logical device. The logical device may utilize the computing resources of any number of computing devices and thereby provide the functionality of the centralized large foundation system (110) described throughout this application and/or all, or a portion thereof, of the methods illustrated in FIGS. 12.1-18.

Figure 5:
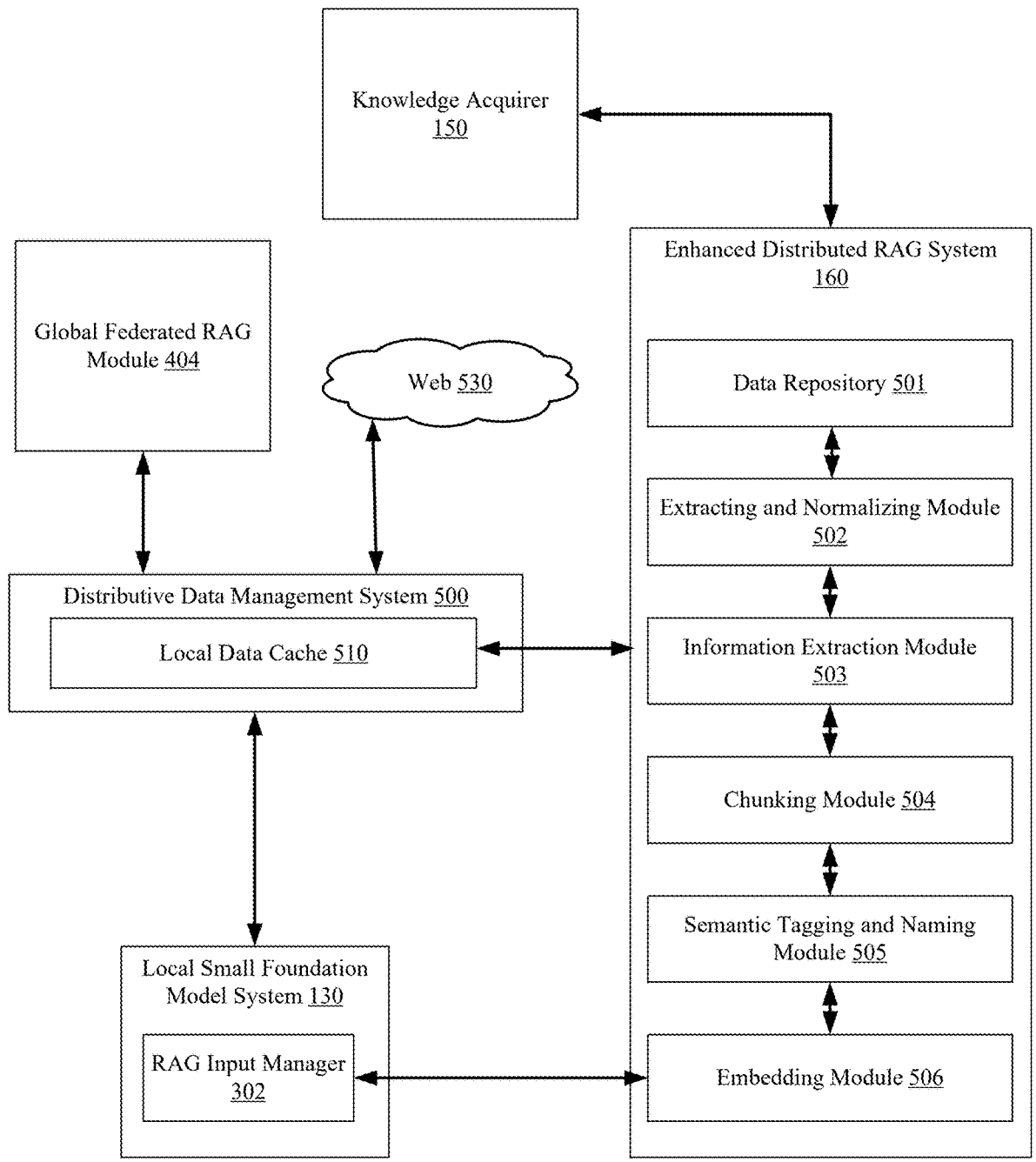
FIG. 5 shows a diagram of an enhanced distributed retrieval augmented generation (RAG) system in accordance with one or more embodiments of the invention.

FIG. 5 shows a diagram of the enhanced distributed RAG system (160) in accordance with one or more embodiments of the invention. The enhanced distributed RAG system (160) is connected to a distributive data management system (500). Each edge site (101A) has an enhanced distributed RAG system (160) and a distributive data management system (500). The set of enhanced distributed RAG systems (160) and distributive data management systems (500) and the global federated RAG module (404) form a federated RAG system. Data is shared between the enhanced distributed RAG system (160) and the global federated RAG module (404). To share this data, the enhanced distributed RAG system (160) and the global federated RAG module (404) are homogeneous systems. The enhanced distributed RAG system (160) is customized to the edge site (101A) on which it is located. The enhanced distributed RAG system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG.

5 may be connected via a network fabric (not shown). Each of these components shown in FIG. 5 is described below.

The enhanced distributed RAG system (160) makes RAG data as local QORs from enterprise data stored on the edge site (101A). The enhanced distributed RAG system (160) includes a data repository (501), an extracting and normalizing module (502), an information extraction module (503), a chunking module (504), a semantic tagging and naming module (505), and an embedding module (506). The data repository (501) stores the enterprise data. The enterprise data may be text, imagery, voice, video, multi-modal, and/or any other form of data. The enterprise data comes from the edge site (101A). New enterprise data may also be added to the data repository (501) by the knowledge acquirer (150). In one or more embodiments, the data repository may be implemented using a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, or any combination thereof.

The extracting and normalizing module (502) extracts usable data from the enterprise data when the enterprise data is multimodal and normalizes the enterprise data. The information extraction module (503) extracts relevant information from the enterprise data including metadata. The chunking module (504) chunks the relevant data parts to be used to form the QORs. The semantic tagging and naming module (505) performs semantic tagging of the relevant data parts to be used to form the QORs.

The embedding module (506) takes the relevant information parts with the semantic tagging and sometimes metadata and creates local QORs. The embedding module (506) allows the local QORs include language embeddings and are used at the local small foundation system (130) to form prompts for the local small foundation model (307). The local QORs are stored in a local database (not shown) in communication with the embedding module (506) and the RAG input manager (302). In some embodiments, the local database is seeded with QORs prior to forming QORs with the enhanced distributed RAG system (160).

The distributive data management system (500) includes a local data cache (510). The local data cache collects enterprise data, relevant information, relevant information parts, semantic tags, and local QORs from the data repository (501), the extracting and normalizing module (502), the information extraction module (503), the chunking module (504), the semantic tagging and naming module (505), and the embedding module (506), respectively. The distributive data management system (500) is also in communication with the local small foundation system (130), the global federated RAG module (404), and the web (530). The distributive data management system (500) provides the document/object retrieval manager (305) with the enterprise data (i.e. documents and objects) corresponding to the QORs relevant to making the prompt. The distributive data management system (500) may transfer data between the enhanced distributed RAG system (160) and the global federated RAG module (404). The distributive data management system (500) manages local access to the global database with the global QORs. If the local small foundation system (130) cannot find proper local QORs in the local database but does find proper global QORs in the global database, the global QORs may be promoted to local QORs and stored in the local database. Promoting the global QORs reduces the data transmission and time needed to access the global database if the global QORs are needed again. This also makes the enhanced distributed RAG system (160) more complete by federating the process of having local QORs stored. The process also works in reverse. If the local small foundation system (130) is preforming a quality check, a blind spot might be found in the global QORs that can be filled by the local QORs (i.e., the global QORs do not have any QOR that corresponds to the query in question). Local QORs may be promoted to global QORs and stored in the global database. Promoting the local QORs allows the data to be used in centralized processes and also makes the local QORs available for enhanced distributed RAG system (160) in other edge sites (101A, 101N). For example, a local QOR from edge site A (101A) can be promoted as a new global QOR and stored in the global database, then the new global QOR can be promoted to be a new local QOR in edge site N (101N). The promoting of QORs causes the plurality of enhanced distributed RAG systems (160) and distributive data management systems (500) and the global federated RAG module (404) to be federated.

In one or more embodiments of the invention, the enhanced distributed RAG system (160) may be implemented as one or more computing devices (see e.g., FIG. 19). The computing device(s) may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the enhanced distributed RAG system (160) described throughout this application and/or all, or a portion thereof, of the methods illustrated in FIGS. 12.1-18.

In one or more embodiments of the invention, the enhanced distributed RAG system (160) is implemented as a logical device. The logical device may utilize the computing resources of any number of computing devices and thereby provide the functionality of the enhanced distributed RAG system (160) described throughout this application and/or all, or a portion thereof, of the methods illustrated in FIGS. 12.1-18.

Figure 6:
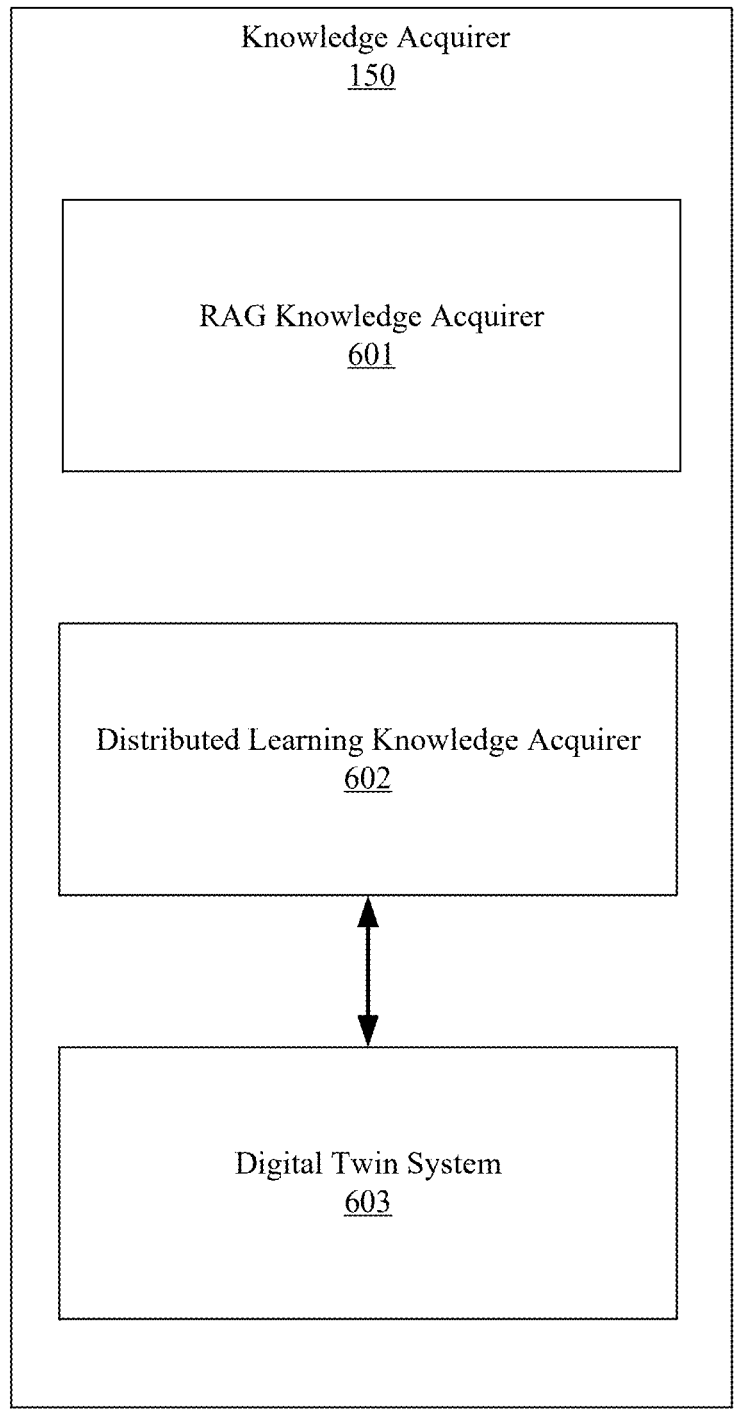
FIG. 6 shows a diagram of a knowledge acquirer in accordance with one or more embodiments of the invention.

FIG. 6 shows a diagram of the knowledge acquirer (150) in accordance with one or more embodiments of the invention. The knowledge acquirer (150) includes a RAG knowledge acquirer (601) and a distributed learning knowledge acquirer (602). The RAG knowledge acquirer (601) is described in FIG. 7. The distributed learning knowledge acquirer (602) is described in FIG. 8. The digital twin system (603) is connected to the distributed learning knowledge acquirer (602) and is described in FIG. 10. The knowledge acquirer may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 6 may be connected via a network fabric (not shown). Each of these components shown in FIG. 6 is described below.

Figure 7:
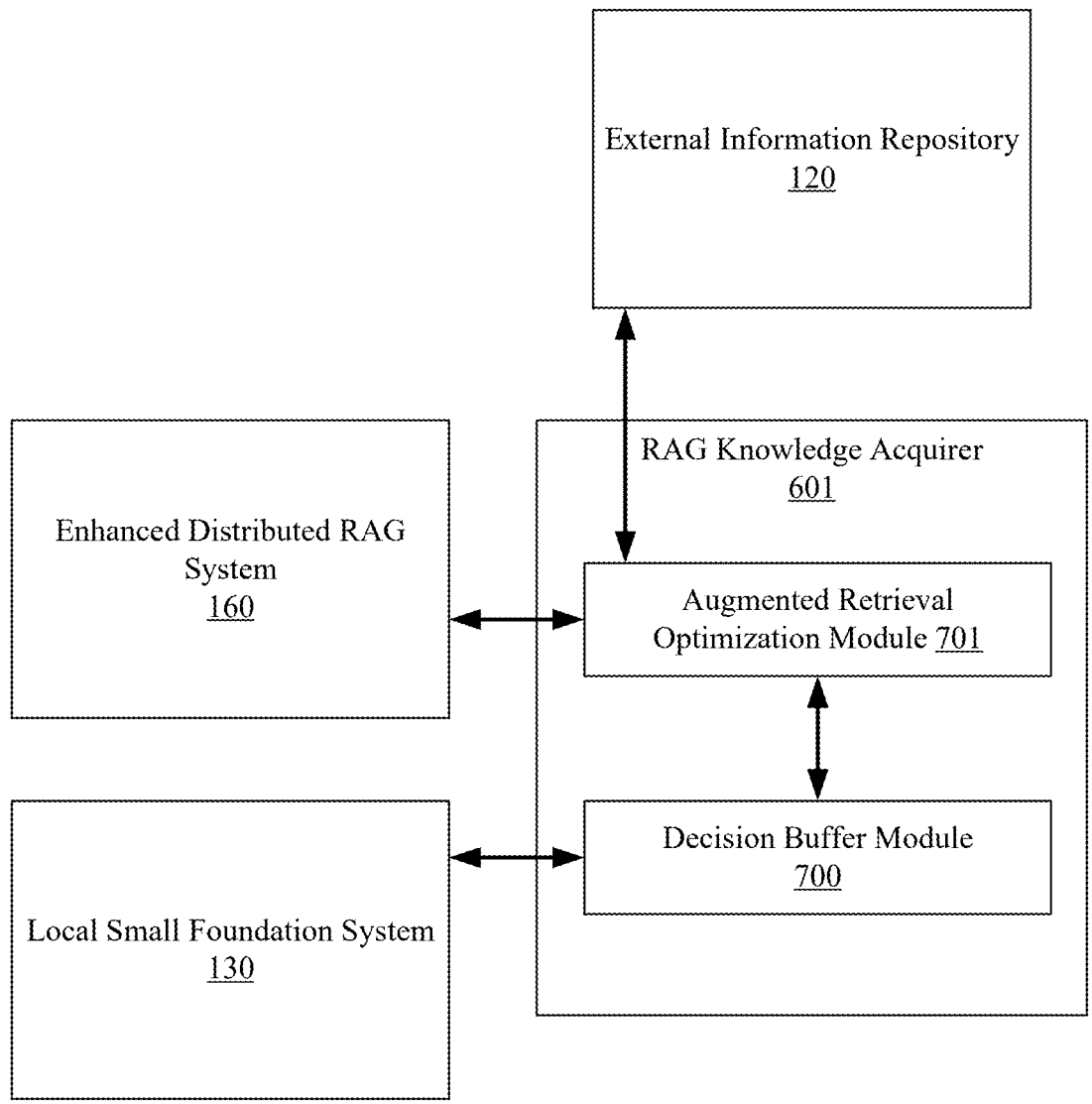
FIG. 7 shows a diagram of a RAG knowledge acquirer in accordance with one or more embodiments of the invention.

FIG. 7 shows a diagram of the RAG knowledge acquirer (601) in accordance with one or more embodiments of the invention. The RAG knowledge acquirer (601) transforms data received by the local small foundation system (130) and the centralized large foundation system (110) into enterprise data for the enhanced distributed RAG system (160). The data includes objects used to make prompts and the classifications the prompts produced in the models. The RAG knowledge acquirer (601) includes a decision buffer module (700) and an augmented retrieval optimization module (701). The RAG knowledge acquirer may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 7 may be connected via a network fabric (not shown). Each of these components shown in FIG. 7 is described below.

The decision buffer module (700) receives the data. The decision buffer module (700) includes a program to determine when the amount of data received at the decision buffer module (700) reaches a threshold for optimization (i.e., when enough data is present to be augmented and sent to the enhanced distributed RAG system (160)). Once the amount of data reaches the threshold, the data is sent to the augmented retrieval optimization module (701). The augmented retrieval optimization module (701) pre-processes the data prior to sending to the enhanced distributed RAG system (160). Pre-processing includes cleaning the data, normalizing the data, transforming the data into new enterprise data, and removing duplicative data. The pre-processing ensures the new enterprise data means requirements of the enhanced distributed RAG system (160). The new enterprise data is transmitted from the augmented retrieval optimization module (701) to the enhanced distributed RAG system (160). A copy of the new enterprise data is processed into master knowledge data and sent to a master knowledge service base (1101) of the external information repository (120).

The RAG knowledge acquirer (601) supplies new enterprise data to the enhanced distributed RAG system (160). This new enterprise data may be used to form new local QORs thereby increasing the effectiveness of the local small foundation system (130). The RAG knowledge acquirer (601) may also act as a gatekeeper to promoted local QORs from FIG. 5. The promoted local QORs may be stored in the local database but not used with the local small foundation system (130) until verified by the RAG knowledge acquirer (601). The local QCRs may be deemed to be verified when new enterprise data that corresponds to the promoted local QORs is sent from the RAG knowledge acquirer to the enhanced distributed RAG system. The new enterprise data confirms the validity of the promoted local QORs because it includes the classification made by the local small foundation system (130) using the promoted local QORs previously at the time of promotion. Because the master knowledge data is sent to the master knowledge service base (1101) of the external information repository (120), which is located in the centralized system (100) with the global federated RAG module (404), the RAG knowledge acquirer (601) can also verify the promotion of promoted global QORs. Each edge site (101A) includes a RAG knowledge acquirer (601). The RAG knowledge acquirers (601) share master knowledge data with the external information repository allowing the RAG knowledge acquirers (601) to be federated.

In one or more embodiments of the invention, the RAG knowledge acquirer (601) may be implemented as one or more computing devices (see e.g., FIG. 19). The computing device(s) may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the RAG knowledge acquirer (601) described throughout this application and/or all, or a portion thereof, of the methods illustrated in FIGS. 12.1-18.

In one or more embodiments of the invention, the RAG knowledge acquirer (601) is implemented as a logical device. The logical device may utilize the computing resources of any number of computing devices and thereby provide the functionality of the RAG knowledge acquirer (601) described throughout this application and/or all, or a portion thereof, of the methods illustrated in FIGS. 12.1-18.

Figure 8:
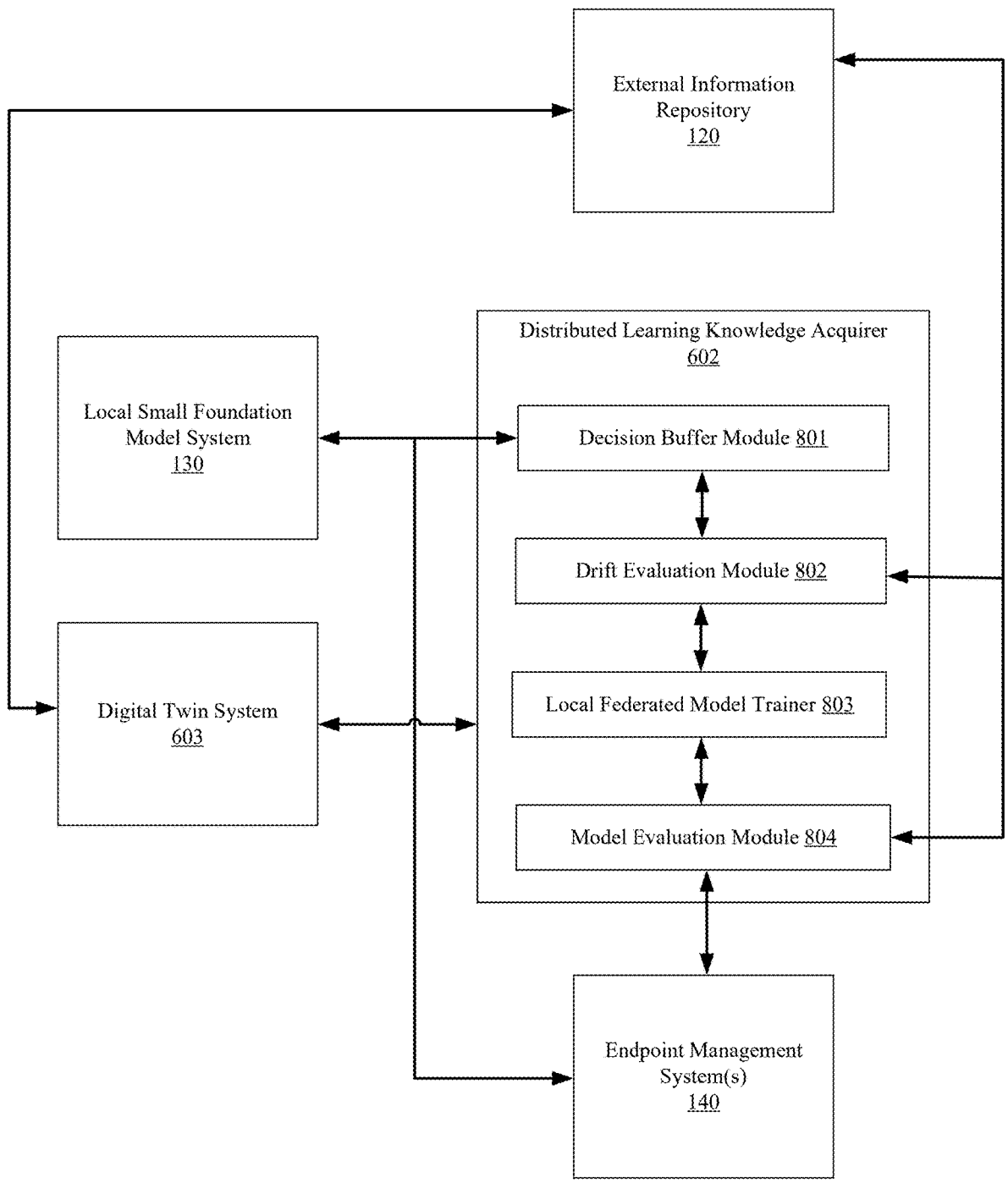
FIG. 8 shows a diagram of a distributed learning knowledge acquirer in accordance with one or more embodiments of the invention.

FIG. 8 shows a diagram of the distributed learning knowledge acquirer (602) in accordance with one or more embodiments of the invention. The distributed learning knowledge acquirer (602) transforms data received by the local small foundation system (130) and the centralized large foundation system (110) into training data for the discriminative AI models. The data includes objects used to make prompts and the classifications the prompts produced in the models. The distributed learning knowledge acquirer (602) includes a decision buffer module (801), a drift evaluation module (802), a local federated model trainer (803), and a model evaluation module (804). The distributed learning knowledge acquirer may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 8 may be connected via a network fabric (not shown). Each of these components shown in FIG. 8 is described below.

The decision buffer module (801) is similar to the decision buffer module (700) from FIG. 7. The decision buffer module (801) determines when the amount of data received at the decision buffer module (801) reaches a threshold for a drift evaluation (i.e., when enough data is present to be determine if the data can be used as training data). Once the amount of data reaches the threshold, the data is sent to the drift evaluation module (802).

The drift evaluation module (802) determines if the data causes a conceptual drift (i.e. if the data causes a conceptual drift the discriminative AI model is not trained to handle that data and the discriminative AI model would be strengthened by training on the data). Using the data as training data for the discriminative AI model would reduce the conceptual drift of the discriminative AI model. The data is formed into local training data. The local training data is sent to a training dataset repository (1102) of the external information repository (120) where it can be used to train discriminative AI models in other edge sites (101A). Since the external information repository (120) is in the centralized system (100), the training of discriminative AI models is federated. Local raining data from other edge sites (101A) can be sent to the distributed learning knowledge acquirer (602) to train the discriminative AI models, federating the training process.

The local federated model trainer (803) receives the local training data and trains the discriminative AI models using the local training data. Once the discriminative AI models are trained, they are sent to the model evaluation module (804). The model evaluation module (804) evaluates the discriminative AI model using data collected from other edge sites (101A) via the external information repository (120). Once the discriminative AI model is validated (i.e., is operating as expected and is no longer experiencing drifts), a copy of the discriminative AI model is sent to a master distributive AI model repository (1103) of the external information repository (120). The copy of discriminative AI model can be distributed to other edge sites (101A) to federate the process. The distributed learning knowledge acquirer (602) can acquire a discriminative AI model from another edge site (101A) via the master distributive AI model repository (1103).

The discriminative AI model is implemented in the end-point management system (140) as the discriminative AI model (200). In some embodiments, the discriminative AI model (200) is modified by the discriminative AI model (not shown) from the distributed learning knowledge acquirer (602). In other embodiments, the discriminative AI model (200) is replaced by the discriminative AI model (not shown) from the distributed learning knowledge acquirer (602).

In one or more embodiments of the invention, the distributed learning knowledge acquirer (602) may be implemented as one or more computing devices (see e.g., FIG. 19). The computing device(s) may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the distributed learning knowledge acquirer (602) described throughout this application and/or all, or a portion thereof, of the methods illustrated in FIGS. 12.1-18.

In one or more embodiments of the invention, the distributed learning knowledge acquirer (602) is implemented as a logical device. The logical device may utilize the computing resources of any number of computing devices and thereby provide the functionality of the distributed learning knowledge acquirer (602) described throughout this application and/or all, or a portion thereof, of the methods illustrated in FIGS. 12.1-18.

Figure 9:
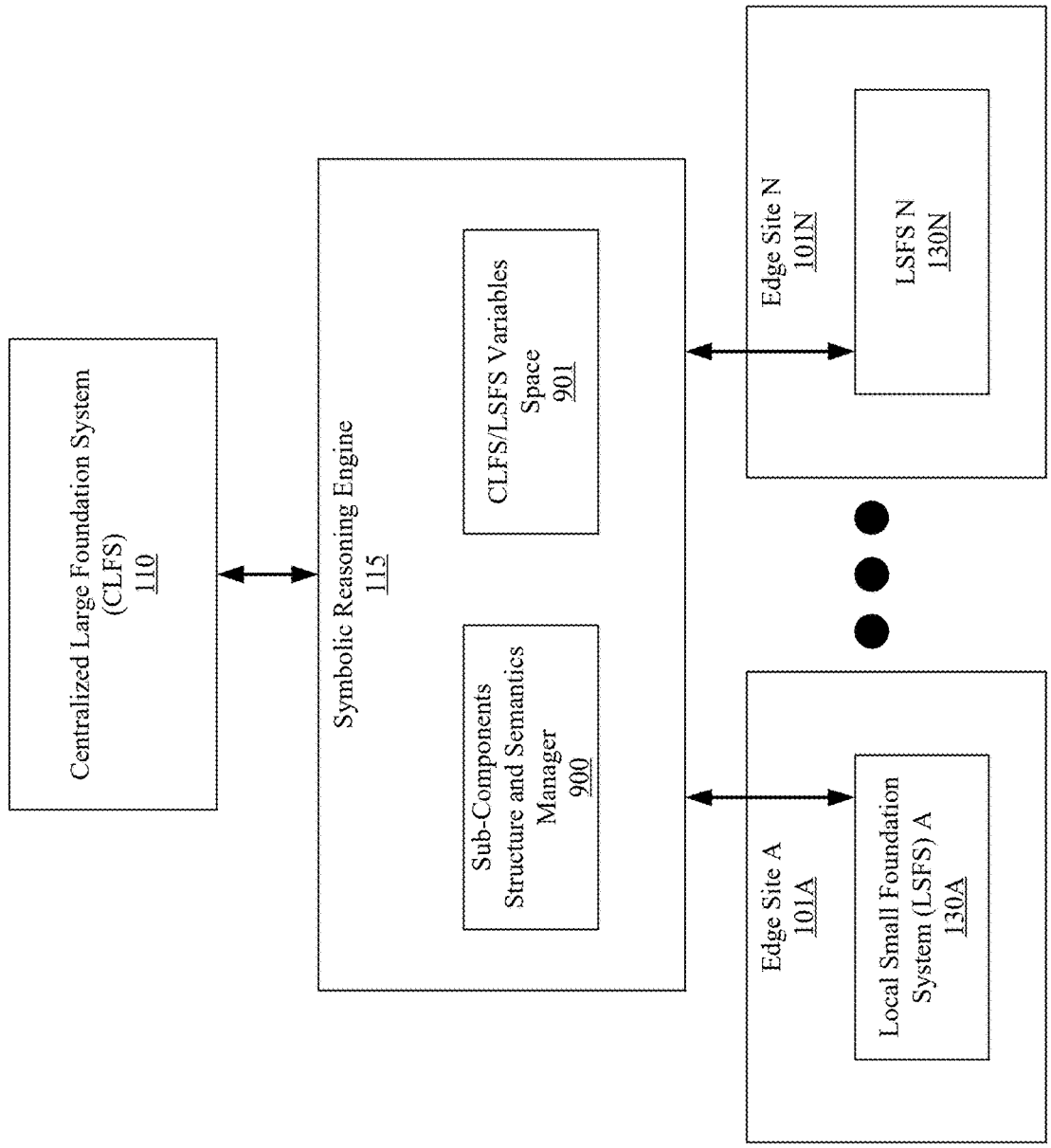
FIG. 9 shows a diagram of a symbolic reasoning engine in accordance with one or more embodiments of the invention.

FIG. 9 shows a diagram of the symbolic reasoning engine (115) in accordance with one or more embodiments of the invention. The symbolic reasoning engine (115) forms variables from sub-components of the centralized large foundation system (110) to send to the local small foundation systems (130) such as local small foundation system (130A) of the edge site A (101A) and local small foundation system (130N) of the edge site N (101N). The symbolic reasoning engine (115) functionally analyzes the operation of the pre-trained centralized large foundation system (110) to learn behavior of constituent sub-components to send to the local small foundation systems (130). The symbolic reasoning engine (115) includes a sub-components structure and semantics manager (900) and a centralized large foundation system (CLFS)/local small foundation system (LSFS) variable space (901). The symbolic reasoning engine may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 9 may be connected via a network fabric (not shown). Each of these components shown in FIG. 9 is described below.

The sub-component's structure and semantics manager (900) develops prompts to send to the centralized large foundation system (110). The prompts include relevant use cases for the local small foundation systems (130). The centralized large foundation system (110) produces data on structural relationships and semantic relationships of sub-components of the central large foundation system (110) in response to the prompting. The data is received at the sub-components structure and semantics manager (900). The sub-components structure and semantics manager (900) instantiates the sub-components of the centralized large foundation system (110) on the symbolic reasoning engine (115). The CLFS/LSFS variable space (901) identifies variables relevant to the local small foundation systems (130). The variables are sent to the local small foundation systems (130) via a connection. The variables for the local small foundation system (130A) may be different than the variables for the local small foundation system (130N).

The symbolic reasoning engine (115) allows for the local small foundation systems (130) to be improved by data from the centralized large foundation system (110) while focused and optimized by only using relevant variables. The variables for the local small foundation system (130A) may be different than the variables for the local small foundation system (130N). This keeps the local small foundation systems (130) targeted to their local edge site (101A).

In one or more embodiments of the invention, the symbolic reasoning engine (115) may be implemented as one or more computing devices (see e.g., FIG. 19). The computing device(s) may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the symbolic reasoning engine (115) described throughout this application and/or all, or a portion thereof, of the methods illustrated in FIGS. 12.1-18.

In one or more embodiments of the invention, the symbolic reasoning engine (115) is implemented as a logical device. The logical device may utilize the computing resources of any number of computing devices and thereby provide the functionality of the symbolic reasoning engine (115) described throughout this application and/or all, or a portion thereof, of the methods illustrated in FIGS. 12.1-18.

Figure 10:
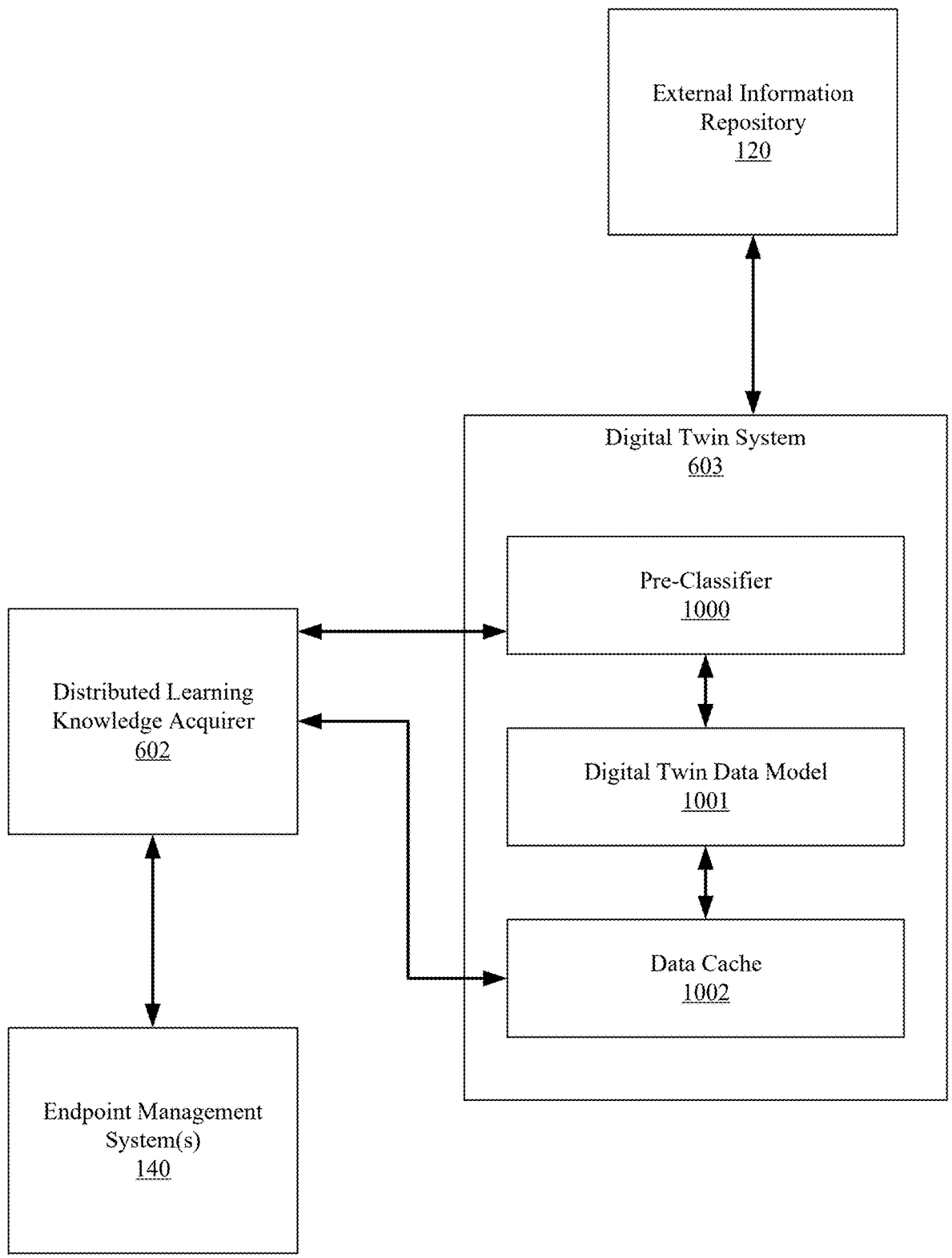
FIG. 10 shows a diagram of a digital twin system in accordance with one or more embodiments of the invention.

FIG. 10 shows a diagram of the digital twin system (603) in accordance with one or more embodiments of the invention. The digital twin system (603) is synchronized to the distributed learning knowledge acquirer (602). The digital twin system (603) includes a pre-classifier (1000), the digital twin model (1001), and a data cache (1002). The digital twin system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 10 may be connected via a network fabric (not shown). Each of these components shown in FIG. 10 is described below.

The pre-classifier (1000) classifies the data. The classification includes a frequency of the data in the distributed learning knowledge acquirer (602), a type frequency of a type to which the data belongs, and an ablation rank of the data. An ablation rank refers to the impact on the data set if a piece of data is removed from the data set (i.e., measuring the importance of each piece of data). Other methods of classification can be used without departing from the invention. After the data is classified, the data is transferred to the digital twin model (1001).

The digital twin system (603) has a digital twin model (1001) of the process done by the distributed learning knowledge acquirer (602). The digital twin model (1001) predicts scenarios where the data in the distributed learning knowledge acquirer (602) could be relevant and ranks this relevancy, the digital twin model (1001) maintains a synchronized view so it can select training data where drift is most prevalent. The digital twin model (1001) may use a decision process based on generative flow networks and Markov decision processes. The digital twin model (1001) forms a ranking for the data. The data cache stores the data and the ranking of the data and transmits both to the distributed learning knowledge acquirer (602) and the training dataset repository (1102). The digital twin system (603) is a digital system that is a virtual counterpart to the distributed learning knowledge acquirer (602), which is a physical system. The digital twin system (603) gives a real-time representation of data in the distributed learning knowledge acquirer (602). This allows for better quality and relevant data sets. The digital twin system (603) is able to model the structure and behavior of the distributed learning knowledge acquirer (602), which allows for more flexibility and precision in addressing various configurations in the data and adapt to changes in real time leading to the ranking process being less costly, faster, more precise, and dynamically adaptable.

Figure 11:
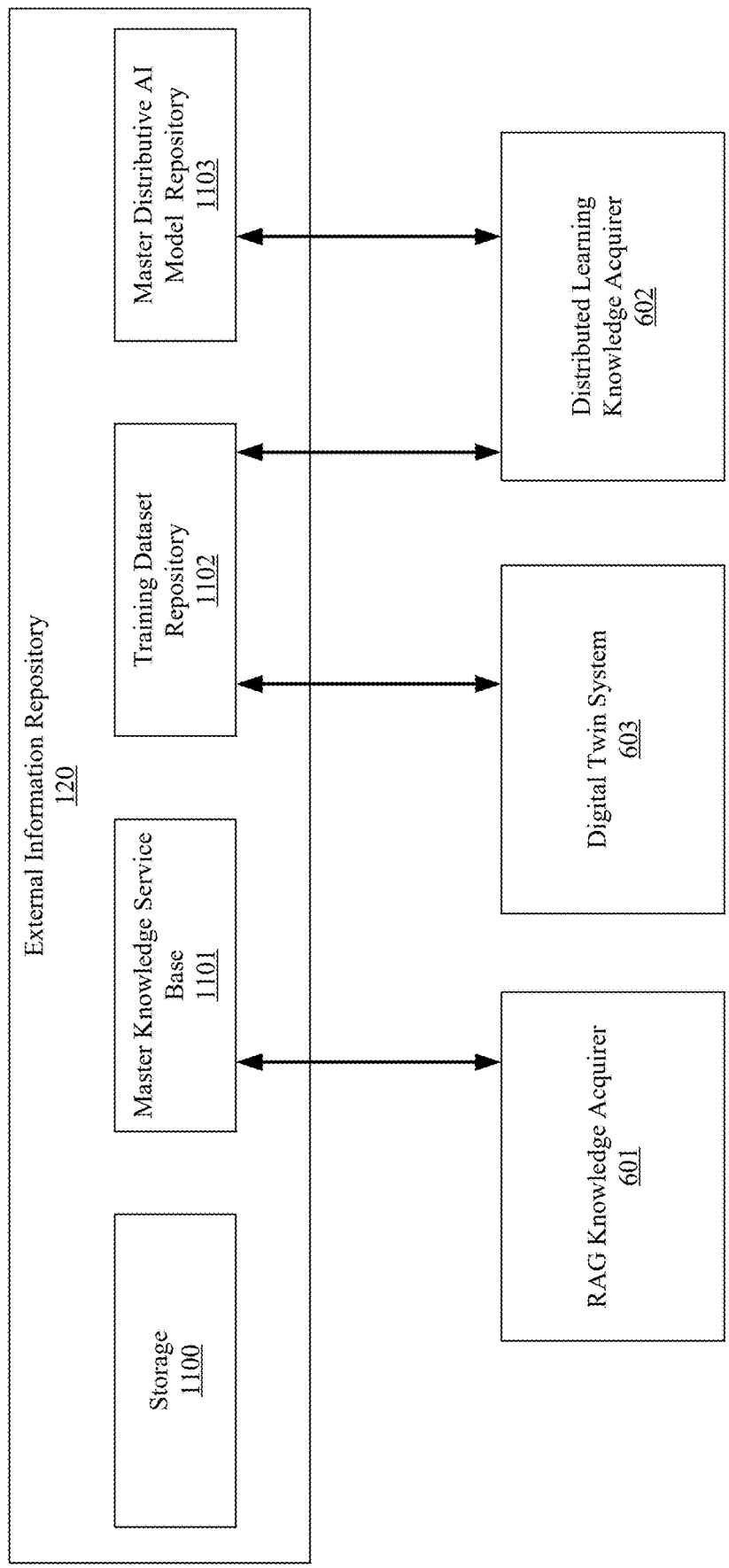
FIG. 11 shows a diagram of an external information repository in accordance with one or more embodiments of the invention.

FIG. 11 shows a diagram of the external information repository (120) in accordance with one or more embodiments of the invention. The external information repository (120) includes a storage (1100), the master knowledge service base (1101), the training dataset repository (1102), and the master distributive AI model repository (1103).

The storage (1100) can manage the other repositories and share data with the centralized large foundation system (110) (not shown). The data sharing between the external information repository (120) and the knowledge acquirers (150) across the edge sites (101A) allows for federated learning with respect to the enhanced distributed RAG systems (160) and the discriminative AI models. The data stored in the external information repository (120) is entered into a global enterprise data catalog for potential use for other edge sites (101A). The data can also be used with the symbolic reasoning engine (115) for upgrading the local small foundation systems (130) and for conventional discriminative AI model training.

In one or more embodiments, external information repository may be implemented using a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, or any combination thereof.

Classifications with the AI Hybrid Distributed Inference System

FIGS. 12.1-12.4 shows a flowchart of a method for operating an artificial intelligence (AI) hybrid distributed inference system. The method of FIGS. 12.1-12.4 may be performed by, for example, the edge site (e.g., 101A, FIG. 1.2) and centralized system (e.g., 100, FIG. 1.2). Other components of the system of FIG. 1.2 may perform all, or a portion, of the method of FIGS. 12.1-12.4 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel.

The method leverages an endpoint management system, a local small foundation model, and a centralized foundation model to form the AI hybrid distributed inference system. The AI hybrid distributed inference system is used to provide directions based on data inputted from a system. The systems can include factories, data centers, or other businesses. The system is hybrid because it leverages discriminative AI models and generative AI models. The system is distributed because the endpoint management system and the local small foundation model are located on an edge site where the data is generated, and the centralized large foundation system is located in a centralized system that is connected to a plurality of other edge sites. The endpoint management system interacts with the input data first and includes a discriminative AI model or heuristic model. If the endpoint management system cannot provide complete direction based on the input data, it sends a query to the local small foundation system. The local small foundation system is specialized to the tasks present on the edge site and has less than ten billion parameters with quantization for a generative AI model. The local small foundation model attempts to provide direction based on the input data. The local small foundation system can send a query or instructions to perform a centralized task to the centralized large foundation system. The local small foundation system is designed to limit the number of use cases that will need to be sent to centralized large foundation system to the focus on complex issues requiring significant generalization and high complexity and reducing computational resource requirement. The centralized large foundation system is over 100 billion parameters. An enhanced distributed RAG system is connected to the local small foundation system to allow for multimodal prompts with class and objects. The enhanced distributed RAG system is federated with other RAG systems in the AI hybrid distributed inference system. The local small foundation system and the centralized large foundation system outputs are captured by a knowledge acquirer to federate the process of training discriminative AI models and producing new RAG data for use in the AI hybrid distributed inference system.

Turning to FIG. 12.1, in step 1200, input data is received at an endpoint management system. The endpoint management system may be the endpoint management system (140) as shown in FIG. 1.2. The endpoint management system may include a discriminative AI model (200) as shown in FIG. 2.1 or the endpoint management system may include a heuristic model (201) as shown in FIG. 2.2. The input data may be received at the external inputs (210). The input data may be visual images, text data, sound recordings, video recordings, or other data.

For example, if the endpoint management system is located at a factory, the input data is specifications on manufactured goods (i.e. a fabricated car door) passing under a sensor at a first station in the factory. The input data is sent to the endpoint management system to determine if the car door is acceptable and can move to a second station in the factory which may have a second endpoint management system to collect new input data.

In step 1201, a calculation is performed on the input data. The calculations produce first classification results. In some embodiments, an inference is performed by the discriminative AI model (200) to produce first classification results. The first classification results are endpoint classification results. The discriminative AI model (200) attempts to classify the input data as either a member of acceptable class or a defective class. In other embodiments, the first classification results are produced by a heuristic model (201). The heuristic model (201) attempts to use a heuristic to determine if the input data is either a member of an acceptable class or a defective class. For example, the measurements of different parts of the car door are analyzed to determine if the car door can be used on a car.

In step 1202, whether the first classification results are resolved to an existing class of a plurality of classes is determined. If the first classification results are resolved to an existing class, the method proceeds to step 1210. If the first classification results are not resolved to an existing class, the method proceeds to step 1203. Both the discriminative AI model (200) and the heuristic model (201) have functionality to determine if the classification results are resolved to an existing class. The discriminative AI model (200) associates a probability with the first classification results. If the probability is below a threshold the first classification is determined to be not resolved to an existing class and further analysis needs to be completed. If the input data is classified to the defective class, further analysis may need to be completed. For example, if a car door is classified as an acceptable class but with only a probability of 20%, then further analysis needs to be completed.

In step 1203, a query is transmitted to a local small foundation system. The query is based on the input data and the first classification results. The query is the first classification results, inference probabilities for all classes, and the object being evaluated. The local small foundation system may be the local small foundation system (130) as shown in FIG. 3. After determining further analysis needs to be completed, the endpoint management system creates the query. The query describes what in the input data could not be classified correctly and removes from the input data related to what has been successfully classified. For example, the dimensions of the car door are correct, but a scratch exists on the door that the endpoint management system could not classify. The query asks for instructions on how to proceed with respect to the car door with the scratch.

In step 1204, RAG data related to the query is obtained from an enhanced distributed RAG system. After receiving the query, the local small foundation system obtains RAG data that relates to the query. RAG data is used to form a prompt to perform an inference. The RAG data allows for the local small foundation system to improve the quality of the inference by giving the local small foundation system access to more data. For example, returning to the car door scenario, an example of the RAG data would be a set of images that represents different types of defects in the door (e.g., different types and levels of scratches, inconsistencies in the level of paint coverage and color consistency, misaligned door parts, other physical damage such as dings. The sets of imagery would include multiple image examples of any condition that the user would consider "unacceptable". The enhanced distributed RAG system (160) performs a visual similarity search utilizing this data to classify the defect(s) and pass that classification, along with additional metadata sourced from the RAG data (e.g., mitigation plan) to the local small foundation system (130). The RAG data need not be all images just describe the problems covered by the query. For example, the enhanced distributed RAG system (160) can perform a language based semantic similarity search for text-based RAG data.

In step 1205, an inference is performed on the query with the RAG data to form second classification results. The second classification results are local classification results. The local small foundation system uses a generative AI model to output second classification results. The local small foundation system uses a generative AI model meaning the classifications allows for generative functions in classification results beyond the discriminative AI model. The local small foundation system allows for content creation and anomaly detection in the second classification results providing the ability to generalize to data not in the training set and to even identify new potential classes when classifying. The local small foundation system includes functionality, via an output guardrail (i.e. 308, FIG. 3), to determine instructions to issue to the endpoint management system based on the second classification results described further in FIGS. 13.1-13.3. For example, returning to the car door scenario, the second classification results could identify the scratch as a painting error and produce the instructions of returning the car door to the paint station in the factory.

In step 1206, whether a centralized large foundation model needs to be consulted in response to the second classification results is determined. If the centralized large foundation model needs to be consulted, the method proceeds to step 1212. If the centralized large foundation model does not need to be consulted, the method proceeds to step 1207. The centralized large foundation system may be the centralized large foundation system (110) as described in FIG. 4. The local small foundation system via the output guardrail (i.e. 308, FIG. 3) consults the centralized large foundation system when the second classification results cannot be resolved to an existing class (e.g. hallucinations, as determined by the output guardrail module) or a centralized action needs to be performed in response to the second classification (e.g. ordering parts for the assembly line).

In step 1207, the second classification results are transmitted to the endpoint managements system. The second classification results include the instructions for the endpoint management system.

In step 1208, the first classification results and the second classification results are transmitted to a knowledge acquirer. The knowledge acquirer may be the knowledge acquirer (150) as shown in FIGS. 1.2 and 6. The knowledge acquire collects output data to refine the system via a federated process described with FIGS. 6, 7, 8, and 10.

In step 1209, the endpoint management system performs an operation in response to the second classification results. The operation is prompted by the instructions. The operation is performed by the external outputs (e.g. 220, FIGS. 2.1-2.2) such as a processor, programmable logic controller, graphical user interface, etc. For example, returning to the car door scenario, a processor could reroute the car door on a conveyer belt back to the paint station in the factory to paint over the scratch. After step 1209, the method ends.

Turning to FIG. 12.2, in step 1210, data associated with the first classification results is transmitted to the knowledge acquirer. Step 1210 happens when the first classification result is resolved to an existing class. The first classification results are sent to the knowledge acquire for the reasons described in step 1208.

In step 1211, the endpoint management system performs an operation in response to the first classification results. The operation is like the operation described in step 1209, but the local small foundation system is not consulted, and the instructions are formed internally by the endpoint management system. After step 1211, the method ends.

Turning to FIG. 12.3, in step 1212, the query and the second classification results are transmitted to the centralized large foundation system. Step 1212 occurs because the local small foundation system determines that the centralized large foundation system needs to be consulted. The transmission of data between the local small foundation system and the centralized large foundation system is described in FIGS. 3 and 13.1-13.3.

In step 1213, whether the second classification results are resolved to an existing class is determined. If the second classification results are resolved to an existing class, the method proceeds to step 1214. If the second classification results are not resolved to an existing class, the method proceeds to step 1218. The determination of whether the second classification results are resolved to an existing class is determined when it is determined if the centralized large foundation system need to be consulted and determines whether the centralized large foundation system is used to classify the data or just perform a centralized action.

In step 1214, a centralized action is performed in response to the second classification results. A centralized action is an action that needs to be performed at the centralized system (e.g., ordering parts). The centralized action does not require a classification be made. For example, returning to the car door scenario, the local small foundation system may send instructions to order more paint to paint the car door and sends this request to the centralized large foundation system so the inventory can be tracked centrally.

In step 1215, the second classification results are transmitted to the endpoint management system. The second classification results are transmitted to the endpoint management system through the local small foundation system. The second classification results include the instructions for the endpoint management system.

In step 1216, the second classification results, the first classification results, and data regarding the centralized action are sent to the knowledge acquirer. The second classification results may be transmitted to the knowledge acquirer through the local small foundation system for the reasons described in in step 1208.

In step 1217, the endpoint management system performs an operation in response to the second classification results. The operation is the same as described in step 1209. After step 1217, the method ends.

Turning to FIG. 12.4, in step 1218, an inference is performed on global RAG data to form third classification results. Step 1218 is performed when it is determined the second classification results are not resolved to an existing class. The global RAG data is based on the query and used to assist in making an inference. The centralized large foundation system inferences in the same way as the local small foundation system but with more parameters, leading to more complex classifications. The third classification is a central classification. For example, returning to the car door scenario, if the local small foundation system cannot determine if the scratch is shallow enough to be painted over, the centralized large foundation system is queried to determine if the car door can be repaired or if the car door should be scrapped.

In step 1219, a centralized action is performed in response to the third classification results. The centralized action is similar to the centralized action in step 1214, just based on the third classification results.

In step 1220, the third classification results are transmitted to the endpoint management system. The third classification results are first transmitted to the local small foundation system from there the third classification results with instructions are transmitted to the endpoint management system.

In step 1221, the first classification results, the second classification results, the third classification results and data regarding the centralized action are transmitted to the knowledge acquirer. The first classification results, the second classification results, the third classification results and data regarding the centralized action may be transmitted to the knowledge acquirer through the local small foundation system for the reasons described in in step 1208.

In step 1222, the endpoint management system performs an operation in response to the third classification results. The operation is described in step 1209 except it is based on instructions from the third classification results. After step 1222, the method ends.

The method can be repeated for new input data such as a second input data and a third input data to receive further classification results.

Inferences from the Local Small Foundation System

FIGS. 13.1-13.3 shows a flowchart of a method of operating a local small foundation system. The method of FIGS. 13.1-13.3 may be performed by, for example, the local small foundation system (e.g., 130, FIG. 3). Other components of the system of FIG. 3 may perform all, or a portion, of the method of FIGS. 12.1-12.4 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel.

The local small foundation system leverages a generative AI model to produce classification results. The local small foundation system is small enough (less than 10 billion parameters) to be located on the edge site and is customized towards the edge site. The local small foundation system uses an output guardrail module to determine if the output, classification results, from the local small foundation model can be resolved to an existing class of a plurality of existing classes. The output guardrail module also provides instructions on how to implement classification results at the endpoint management system. The output guardrail module also determines if the centralized large foundation system needs to be consulted and what to send to the centralized large foundation system. If data is sent to the centralized large foundation system, the data is sent through the tokenization and semantic compression manager. The tokenization and semantic compression manger simplifies the data sent reducing the transmission time and memory used.

Turning to FIG. 13.1, in step 1300, a query is received from an endpoint management system at an endpoint management system manager of a local small foundation system. The endpoint management system manager may be the endpoint management system manager (301) as shown in FIG. 3. The query and how the query is formed is described in steps 1200-1203 in FIG. 12.1.

In step 1301, retrieval augmented generation (RAG) data is obtained from an enhanced distributed RAG system at a RAG input manager. The enhanced distributed RAG system may be the enhanced distributed RAG system (160) as shown in FIG. 5 and the RAG input manager may be the RAG input manager (302) as shown in FIG. 3. The RAG data is selected for similarities to the query to assist in making a prompt for the local small foundation model. The RAG data includes query optimized representations (QOR) described further in FIGS. 5 and 14.

In step 1302, the RAG data is searched to produce relevant data to the query. Though the RAG data was selected due to similarities with the query, this search refines the data used to make the prompt and produce a more accurate classification. The searching may be performed by the search manager (e.g., 303, FIG. 3).

In step 1303, the relevant data is ranked based on the query. The ranking may be performed by the data relevance ranking manager (e.g., 304, FIG. 3). The ranking refines the data used to make the prompt and produce a more accurate classification. The data relevance ranking manager uses the similarity search (visual or language based semantic) described in step 1204 with FIG. 12.1 to perform the ranking. The similarity search produces with the potential matches a corresponding similarity score. The data relevance ranking manager choses the top (N) results (where N is often 1, i.e., the highest scoring result) and passes that highest scoring classification, along with additional metadata sourced from the RAG data (e.g., mitigation plan) to the document/object retrieval manager.

In step 1304, documents and objects used to formulate the relevant data are retrieved from the enhanced distributed RAG system. To form the prompt, the underlying data (e.g., objects and documents) represented by the QORs in the RAG data is needed. The documents and the objects that make up the actual data are stored in the enhanced distributed RAG system. The retrieval may be completed by the document/object retrieval manager (e.g., 305, FIG. 3).

In step 1305, a prompt is generated by combining the documents and the objects with the query. The prompt is formed as an input to the local small foundation model. The prompt can be generated by the prompt generation manager (e.g., 306, FIG. 3).

In step 1306, an inference on the prompt is performed to generate first classification results. The prompt is used to receive the first classification result as an output. The first classification result is a local classification result. The inference is performed by the local small foundation model which may be the local small foundation model (307) as shown in FIG. 3.

In step 1307, whether a centralized large foundation model needs to be consulted in response to the first classification results is determined. If the centralized large foundation model needs to be consulted, the method proceeds to step 1310. If the centralized large foundation model does not need to be consulted, the method proceeds to step 1308. The centralized large foundation model needs to be consulted for two reasons, a centralized action needs to be performed or a centralized classification is needed due to the failure of the first classification.

The output guardrail module (e.g., 308, FIG. 3) may perform both checks. In one embodiment of the invention, the output guardrail first determines whether the first classification results are not hallucinatory by identifying the first local classification result corresponds to a possible classification on a whitelist. If the first classification results are hallucinatory, the centralized large foundation system would be needed to perform second classification results. The output guardrail then determines that the first classification results are resolved to an existing class by identifying that the first classification results do not correspond to a possible classification on a blacklist. If the first classification results are on the blacklist, the centralized large foundation system would be needed to perform second classification results. Finally, the output guardrail module determines whether the instructions associated with the first classification results require a centralized action at the centralized large foundation system. Referring back to the RDF format described in FIG. 3, the output guardrail module (308) verifies critical information is provided and formatted properly. The output guardrail module (308) has a set of allowable actions given the context of the prompt and resource using the whitelist and the blacklist.

In step 1308, the first classification results and the query are transmitted to a knowledge acquirer. The first classification results and query are transmitted as described in step 1208 of FIG. 12.1.

In step 1309, the first classification results are transmitted to the endpoint management system. The first classification results include instructions to the endpoint management system to perform an operation. The first classification results are sent by the output guardrail module. Prior to sending, the output guardrail module confirms the first classification results, include instructions for the endpoint management system, and adds or modifies the instructions, if needed. The operation is described in step 1209 of FIG. 12.1. After step 1309, the method ends.

Turning to FIG. 13.2, in step 1310, the first classification results and the query sent by the local small foundation system are received at the centralized large foundation system when the centralized large foundation system needs to be consulted. Information sent between the local small foundation system and the centralized large foundation system is performed by the tokenization and semantic compression manager (e.g., 309, FIG. 3). The tokenization and semantic compression manager is configured to send embedded representation memory index of data (i.e., a token) to the centralized large foundation system from the local small foundation system if possible. Tokens may be used when the data to be indexed is present on both the local small foundation system and the centralized large foundation system. The tokenization and semantic compression manager also compresses the data even when index data is not possible to reduce the amount of data being transmitted. The tokenization and semantic compression manager works in reverse sending embedded representation index of the data from the centralized large foundation system to the local small foundation system. By tokenizing the data into an embedded representation index, latency is improved. The tokenization and semantic compression manager is able to function because the local small foundation system and the centralized large foundation system use the same embedding algorithm, database cache, and representation as described in FIGS. 9 and 17.

In step 1311, whether the first classification results are resolved to an existing class is determined. If the first classification results are resolved to an existing class, the method proceeds to step 1312. If the first classification results are not resolved to an existing class, the method proceeds to step 1315. The description of determining if the first classification results are resolved is shown in step 1307.

In step 1312, a centralized action is performed in response to the first classification results. The centralized action is described in step 1215 of FIG. 12.3.

In step 1313, the first classification results, the query, and data on the centralized action are transmitted to the knowledge acquirer. The transmission to the knowledge acquirer is described in step 1216 of FIG. 12.3.

In step 1314, the first classification results are transmitted to the endpoint management system. The first classification results include instructions to the endpoint management system to perform an operation. The first classification results are transmitted as described in step 1309. After step 1314, the method ends.

Turning to FIG. 13.3, in step 1315, global RAG data is obtained from a global federated RAG module. The global federated RAG module may be the global federated RAG module (404) as shown in FIG. 5.

In step 1316, an inference is performed on the query using the global RAG data. The inference generates second classification results. The second classification results are centralized classification results. The inference is similar to the inference performed in step 1218 of FIG. 12.4.

In step 1317, a centralized action is performed in response to the second classification results. The centralized action is described in step 1219 of FIG. 12.4.

In step 1318, the first classification results, the second classification results and the query are transmitted to the knowledge acquirer and the local small foundation system. The transmission is described in step 1221 of FIG. 12.4.

In step 1319, the second classification results are transmitted to the endpoint management system. The second classification results include instructions to the endpoint management system to perform an operation. The second classification results are transmitted to the output guardrail module and checked and transmitted as shown in step 1309. After step 1319, the method ends.

The method can be repeated for new queries such as a second query and a third query to receive further classification results.

Creating RAG Data with the Enhanced Distributed RAG System

Figure 14:
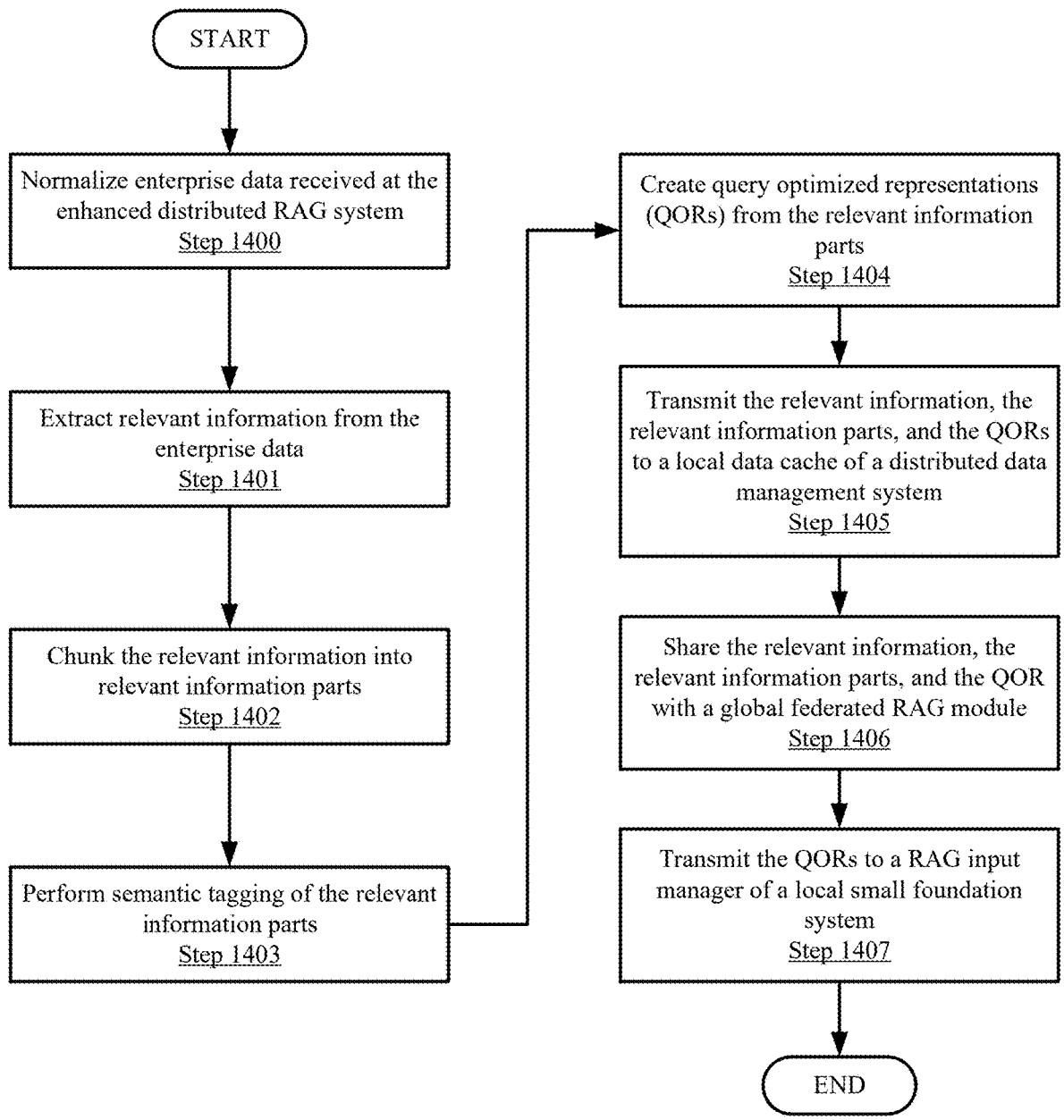
FIG. 14 shows a flowchart of a method for creating a query optimized representation in accordance with one or more embodiments of the invention.

FIG. 14 shows a flowchart of a method of forming query optimized representations (QORs). The method of FIG. 14 may be performed by, for example, the enhanced distributed RAG system (e.g., 160, FIG. 5). Other components of the system of FIG. 5 may perform all, or a portion, of the method of FIG. 14 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel.

The enhanced distributed RAG system provides RAG data to the local small foundation system to form prompts. The enhanced distributed RAG system creates local QORs that are matched with queries to create prompts. The enhanced distributed RAG system located on one edge site is connected to the global federated RAG module which is connected to other enhanced distributed RAG systems in other edge sites. QORs can be distributed across the enhanced distributed RAG systems and the global federated RAG module by promoting local QORs to global QORs and vice versa.

Turning to FIG. 14, in step 1400, enterprise data received at an enhanced distributed RAG system is normalized. Enterprise data is described in FIG. 5 and may be stored in the data repository (e.g., 501, FIG. 5). The enterprise data may be normalized by the extracting and normalizing module (e.g., 502, FIG. 5). The normalization includes formatting the enterprise data to be formed into QORs and allows the data to be more interpretable.

In step 1401, relevant information is extracted from the enterprise data. The relevant information may be extracted by the information extraction module (e.g., 503, FIG. 5). Relevant information can be details in an image or portions of a document that will be relevant. The relevant information may be metadata from the enterprise data. For example, an image of a proper door handle for a car door may be broken down in smaller images showing each correct dimension.

In step 1402, the relevant information is chunked into relevant information parts. The chucking may be performed by the chucking module (e.g., 504, FIG. 5). The chunking creates searchable chunking catalogs with metadata. Chunking allows for faster retrieval of data and parallel processing of the data. Chucking also preserves the context of the relevant information.

In step 1403, semantic tagging of the relevant information parts is performed. The semantic tagging may be performed by the semantic tagging and naming module (e.g., 505, FIG. 5). The semantic tags provide meaning and context to the chucked relevant data to allow for improved data retrieval and inferences made using the relevant information.

In step 1404, QORs are created from the relevant information parts. The QORs may be created by the embedding module (e.g., 506, FIG. 5). The steps 1400 to 1404 create the QORs which are used by the local small foundation system as RAG data to form prompts. The QORs can include multiple modalities of data. The QORs are not limited to embedding and vector databases. The QORs can turn any enterprise data into RAG data that can be used to form a prompt from a query and have this information stored in a database. The QORs created are local QORs. QORs created at the global federated RAG module are global QORs. Web QORs are QORs formed from information from the web.

In step 1405, the relevant information, the relevant information parts, and the QORs are transmitted to a local data cache of a distributed data management system. The local data cache (e.g., 510, FIG. 5) manages data from the enhanced distributed RAG system in the distributed data management system (e.g., 500, FIG. 5).

In step 1406, the relevant information, the relevant information parts, and the QORs are shared with a global federated RAG module. The distributed data management system (e.g., 500, FIG. 5) allows for sharing of QORs between the enhanced distributed RAG system and the global federated RAG module (e.g., 404, FIG. 4). The distributed data management system has access to the local database with the local QORs, the global database with the global QORs, and the web database with the web QORs. The sharing of QORs is possible because all enhanced distributed RAG systems and the global federated RAG module are homogenous due to similar embedding structures allowing for the sharing of data.

In step 1407, the QORs are transmitted to a RAG input manager of the local small foundation system. The QORs are stored in databases prior to being transmitted to the RAG input manager (e.g., 302, FIG. 3) of the local small foundation system (e.g., 130, FIG. 3). The RAG input manager first searches the local QORs in the local database. If the local QORs satisfy the query, the selected local QORs are transmitted to the RAG input manager. If the local QORs do not satisfy the query, the RAG input manager searches the global QORs in the global database and the web QORs in the web database.

If global QORs are selected, they are transmitted to the RAG input manager. If a global QOR is selected that is not present in the local database, a copy of the global QOR can be promoted to a local QOR. The new local QOR is stored in the local database and is either available for use as a local QOR immediately or placed on hold until it is verified. In some embodiments, the RAG input manager searches the global database at the same time as searching the local database as a quality check on the global QORs. If the quality check reveals the global database does not have a related QOR to a useful local QOR, a copy of the useful local QOR can be promoted to a new global QOR. The new Global QOR is stored in global database and is either available for use as a global QOR immediately or placed on hold until it is verified. By allowing local QORs and global QORs to be promoted between the local database and the global database, a local QOR from a first enhanced distributive RAG system in a first edge site can be promoted to be a global QOR and then promoted again to be a local QOR in a second enhanced distributive RAG system in a second edge site.

The method can be repeated with new enterprise data to form new local QORs.

Forming Enterprise Data with the RAG Knowledge Acquirer

Figure 15:
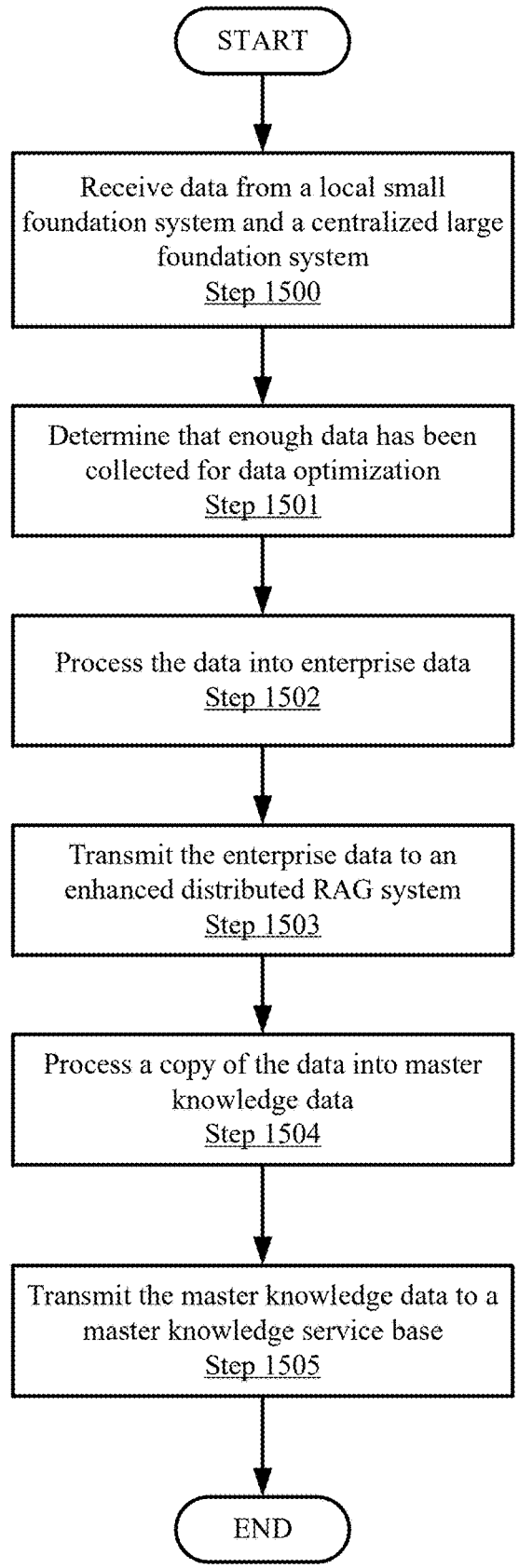
FIG. 15 shows a flowchart of a method for creating local training data in accordance with one or more embodiments of the invention.

FIG. 15 shows a flowchart of a method for transforming data. The method of FIG. 15 may be performed by, for example, the RAG knowledge acquirer (e.g., 601, FIG. 7). Other components of the system of FIG. 7 may perform all, or a portion, of the method of FIG. 15 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel.

The RAG knowledge acquirer receives output data from the local small foundation system and the centralized foundation system and creates new enterprise data for the enhanced distributed RAG system. The RAG knowledge acquirer is connected to the external information repository allowing data sharing and federated learning with the other edge sites. The new enterprise data incorporates knowledge gained from previous inferences made by the local small foundation system and the centralized foundation system and improves the function of the local small foundation system. The new enterprise data can also verify promoted local QORs as producing prompts that lead to correct classifications.

Turning to FIG. 15, in step 1500, data from a local small foundation system and a centralized foundation system is received at a retrieval augmented generation (RAG) knowledge acquirer.

In step 1501, that enough data has been collected for data optimization is determined. The data buffer module (e.g., 700, FIG. 7) determines that a threshold amount of data is present to begin data optimization. The threshold amount is set at a level to optimize the data processing. The data is measured for frequency of observance. The threshold is based on the process on which the data is based but is normally set to an observed anomaly of greater than 5% of total processed data. It can be lower or higher based on the process. Once the threshold amount is reached. The data is transmitted to the augmented retrieval optimization module.

In step 1502, the data is processed into enterprise data. The processing is performed by the augmented retrieval optimization module (e.g., 701, FIG. 7). The processing includes data cleaning, normalization, data transformation, and removal of duplicate pieces of data. The enterprise data is finally checked to confirm it meets RAG requirements.

In step 1503, the enterprise data is transmitted to the enhanced distributed RAG system. The enterprise data is then transmitted over an operative connection to the enhanced distributed RAG system (e.g., 160, FIG. 5) to be formed into QORs. Since the enterprise data is formed from the output data from the local small foundation system and the centralized large foundation system, receiving the enterprise data at the enhanced distributed RAG system verifies the promoted local QORs from FIG. 14 because the enterprise data indicates the inference made was successful. If the promoted local QORs are stored until verification, they can be used after receiving the corresponding enterprise data. The enterprise data formed from data from the local small foundation system is customized to the local small foundation system increasing the accuracy of the classifications made by the local small foundation system.

In step 1504, a copy of the data (obtained in step 1501) is processed into master knowledge data. The copy of the data is processed as shown in step 1502.

In step 1505, the master knowledge data is transmitted to a master knowledge service base. The master knowledge data is transmitted to the master knowledge service base of an external information repository via an operative connection. The master knowledge service base is located at the centralized location allowing for federated learning to the plurality of edge sites based on the master knowledge data.

The method can be repeated with new data to form new enterprise data.

Figure 16:
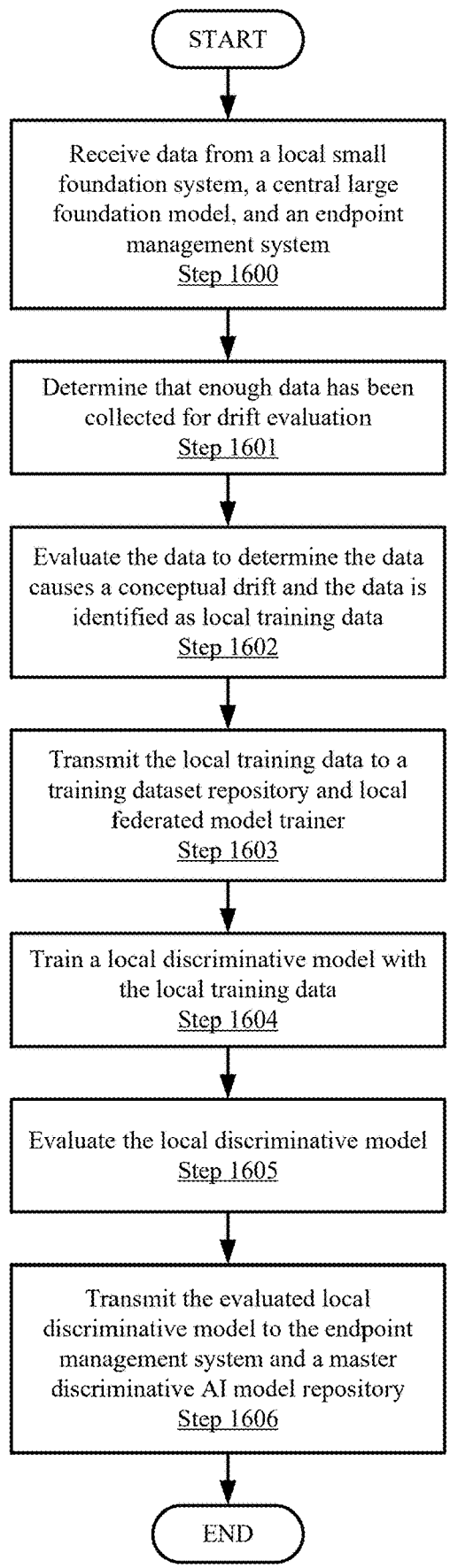
FIG. 16 shows a flowchart of a method for creating a local discriminative model in accordance with one or more embodiments of the invention.

Forming AI Discriminative Models with the Distributed Learning Knowledge Acquirer FIG. 16 shows a flowchart of a method for creating discriminative artificial intelligence (AI) models. The method of FIG. 16 may be performed by, for example, the distributed learning knowledge acquirer (e.g., 602, FIG. 8). Other components of the system of FIG. 8 may perform all, or a portion, of the method of FIG. 16 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel.

The distributed learning knowledge acquirer allows for the training of discriminative AI models on the output data from the generative AI models in the local small foundation system and the centralized large foundation system. This allows for the discriminative AI models which make the first classifications. Classifying input data completely at the discriminative AI model level is cheaper, easier, and more time efficient so continuous updates of the discriminative AI model is critical. The distributed learning knowledge acquirer is connected to the centralized system allowing for data sharing between distributed learning knowledge acquirers in different edge sites up to and including federated learning.

Turning to FIG. 16, in step 1600, data from a local small foundation system, a centralized foundation system, and an endpoint management system is received at a distributed learning knowledge acquirer. The distributed learning knowledge acquirer is operatively connected to the local small foundation system, the centralized foundation system, and the endpoint management system. The data is received at the decision buffer module (e.g., 801, FIG. 8).

In step 1601, that enough data has been collected for drift evaluation is determined. The decision buffer module determines that a threshold amount of data has been received. The threshold amount is set to increase the probability that enough data is present to cause a conceptual drift. Once the amount of data reaches the threshold amount the data is transmitted to the drift evaluation module (e.g., 802, FIG. 8).

In step 1602, the data is evaluated to determine the data causes a conceptual drift. The data is then identified as local training data. The drift evaluation module determines that the conceptual drift occurs. Conceptual drift, in discriminative AI models, refers to the phenomenon where the relationship between input features and target labels changes over time, causing the model's learned decision boundaries to become misaligned with the evolving data. This typically occurs in dynamic environments where the underlying data distribution or patterns shift due to external factors, such as, e.g., changing user behavior, or environmental conditions. Conceptual drift can manifest as sudden, gradual, or reoccurring changes, leading to degraded model performance, increased errors, and misclassifications.

As noted above, conceptual drift during use of a discriminative AI model is an issue but is valuable when training or retraining a discriminative AI model. Training data should cause a conceptual drift or there is no reason to use the data as training data as the discriminative AI model already knows how to classify the similar data. By causing a conceptual drift the data can be used as training data.

In step 1603, the local training data is transmitted to the training dataset repository and the local federated model trainer. The local training data is transmitted to the local federated model trainer (e.g., 803, FIG. 8) via an operative connection to train discriminative AI models. The local training data is transmitted to the training dataset repository (e.g., 1102, FIG. 11) via an operative connection to distribute the local training data to the centralized system and other distributed learning knowledge acquirers.

In step 1604, a local discriminative model is trained with the local training data. The local discriminative model may be a new discriminative AI model, or a copy of a discriminative AI model form the endpoint management system (e.g., 140, FIG. 2.1). After training, the local discriminative model is transmitted to the model evaluation module (e.g., 804, FIG. 8).

In step 1605, the local discriminative model is evaluated. The local discriminative model is evaluated by the model evaluation module to determine if the local discriminative model is ready to be used as the discriminative AI model (e.g., 200, FIG. 2.1) at the endpoint management system. Data different from the training data used to the train the local discriminative model is needed to be used as input data to determine if the local discriminative model can give correct outputs. Different training data can be retrieved from the training dataset repository that is stored there by other discriminative learning knowledge acquires in different edge sites.

In step 1606, the evaluated local discriminative model is transmitted to the endpoint management system and a master discriminative AI model repository. Once evaluated, the local discriminative model is transmitted to endpoint management system to be the discriminative AI model replacing or modifying the current discriminative AI model. The local discriminative model includes elements trained on data produced locally on the edge site by classifications from the local small foundation system and data produced centrally at the centralized system by classifications of the centralized large foundation system.

The method can be repeated with new data to train new local discriminative models.

Refining the Local Small Foundation System with the Symbolic Reasoning Engine

FIG. 17 shows a flowchart of a method for refining a local small foundation system. The method of FIG. 17 may be performed by, for example, the symbolic reasoning engine (e.g., 150, FIG. 9). Other components of the system of FIG. 9 may perform all, or a portion, of the method of FIG. 17 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel.

The symbolic reasoning engine allows for the distribution of relevant variables based on the centralized large foundation system to be used to refine the local small foundation models of the plurality of local small foundation systems. This allows for the local small foundation systems to take advantage of relevant portions of the centralized large foundation system while remaining more focused and optimized the edge site the local small foundation system is located. The sharing of the variables also allows for the tokenization and semantic compression manager to send tokens between the local small foundation system and the centralized large foundation system instead of the complete data.

Turning to FIG. 17, in step 1700, a centralized large foundation system is prompted with a plurality of relevant use cases for a local small foundation system. The local small foundation system (e.g., 130, FIG. 3) is on an edge site A (e.g., 101A, FIG. 1.2). For example, the relevant use cases include information on the types of inferences and queries the local small foundation system creates and receives in the edge site A.

In step 1701, the symbolic reasoning engine receives data on structural and semantic relationships of sub-components of the centralized large foundation system. The centralized large foundation system (e.g., 110, FIG. 4) works through the relevant use cases generating an output. The symbolic reasoning engine observes the behavior of the centralized large foundation system and receives data on structural and semantic relationships of sub-components activated by the centralized large foundation system. For example, when the centralized large foundation system (110) is part of an industrial system and is trained on both the generalized overall system and sub-components of the industrial system. The centralized large foundation system (110) is trained with both successful scenarios and anomalies using a sampling rate (samples per second) to capture the structural and behavioral aspects of the sub-components. The local small foundation system (130) has the same architecture as the centralized large foundation system (110) with higher quantization and fewer attention heads to achieve the lower parameter count (at least ten times less parameters than the centralized large foundation system (110)). Semantic relationships are used to represent the dependency between the sub-components as well as sub-components' process flows when variables of the sub-components are incorporated into the local small foundation system (130) in step 1705. The semantic relationships may be represented in a declarative rule-based or decision trees, graphs as well as with notations from languages such as Web Ontology Language (OWL) and similar languages.

In step 1702, the sub-components are instantiated on the symbolic reasoning engine. The symbolic reasoning engine uses the data received to instantiate the relevant sub-components in the sub-components structure and semantics manager (e.g., 900, FIG. 9).

In step 1703, structural relationships of the sub-components are determined to have stabilized into a stationary distribution. After the sub-components are instantiated, the sub-components structure and semantics manager determines that the sub-components have stabilized into a stationary distribution. A stationary distribution means that the sub-components have reached equilibrium and can provide stable outputs. Once the sub-components reach stationary distribution, variables can be selected from the sub-components.

In step 1704, relevant variables to the local small foundation system are determined from the sub-components. The CLFS/LSFS variable space (e.g., 901, FIG. 9) determines the relevant variables from the sub-components and retrieves the relevant variables.

In step 1705, the relevant variables are transmitted to the local small foundation system. The relevant variables are transmitted from the CLFS/LSFS variable space to the local small foundation system via an operative connection. The relevant variables are used to refine a generative AI model in the local small foundation system. The relevant variables being shared by both the local small foundation system and the centralized large foundation system cause a semantic embedding to exist between the models. The tokenization and semantic compression manager uses this semantic embedding to create tokens for data transferred between the local small foundation system and the centralized large foundation system. The larger amount of shard relevant variables the larger the amount of data that can be transformed into tokens by the tokenization and semantic compression manager.

The method can be repeated for a second local small foundation system located on a second edge site and a local small foundation system N (e.g., 130N, FIG. 9) located on an edge site N (e.g., 101N, FIG. 9).

Ranking Data with the Digital Twin System

FIG. 18 shows a flowchart of a method of ranking data for use in training AI discriminative models. The method of FIG. 18 may be performed by, for example, the digital twin system (e.g., 603, FIG. 10). Other components of the system of FIG. 10 may perform all, or a portion, of the method of FIG. 18 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel.

The digital twin system allows for real time classification and ranking of data received from the distributed learning knowledge acquirer. The digital twin system can rank the data while the distributed learning knowledge acquirer is performing a drift evaluation leading the distributed learning knowledge acquirer have ranked training data after discovering a conceptual drift. The digital twin system more flexibility and precision in ranking the data in a digital twin to the distributed learning knowledge acquirer's physical system. Digital twin system causes a model driven approach to allow for superior predictive capabilities by being able to examine large state spaces.

Turning to FIG. 18, in step 1800, data is received from a distributed learning knowledge acquirer. The data received from the distributed learning knowledge acquirer (e.g., 602, FIG. 8). The data is the same data described in step 1600 of FIG. 16. The digital twin system needs to receive all data the distributed learning knowledge acquirer receives in order to create a proper ranking of the data.

In step 1801, the data is classified. The classification includes a frequency of the data (i.e., frequency of observance), a frequency of a type of the data, and an ablation rank of the data. The classification forms classified data. The frequency of the data, the frequency of a type of the data, and the ablation rank of the data are described in FIG. 10. The data is classified by the pre-classifier (e.g., 1000, FIG. 10). The data is classified to assist in the ranking of the data.

In step 1802, the classified data is transmitted to the digital twin data model. The classified data is transmitted from the pre-classifier to the digital twin data model (e.g., 1001, FIG. 10).

In step 1803, the classified data is ranked by the digital twin data model to from a ranking. The digital twin data model uses the frequency of the data, the frequency of a type of the data, and the ablation rank of the data as inputs to rank the data. The data is ranked to indicate the relative effectiveness of using the data to train discriminative AI models in the distributed learning knowledge acquirer. The digital twin data model may be an AI model with the rankings being its output.

In step 1804, the data and the ranking are stored in a data cache. The data and the ranking are transmitted from the digital twin data model to the data cache (e.g., 1002, FIG. 10). The data and ranking are stored based on a frequency of observance and the digital twin model's ranked relevance.

In step 1805, the data and the ranking are transmitted to the distributed learning knowledge acquirer and the training data repository. The data and the ranking are kept in the data cache until needed by the distributed learning knowledge acquirer. Once the distributed learning knowledge acquirer confirms the data can be used as training data, the data and ranking are transmitted to the distributed learning knowledge acquirer via an operative connection to assist in the training of the discriminative AI models since the ranking is a ranking of the new training data. The data and ranking are transmitted to the training data repository (e.g., 1102, FIG. 11) so the ranking can be used by other distributed learning knowledge acquirer in other edge sites using the data.

The method can be repeated with new data to rank the data used to train new discriminative AI models.

As discussed above, embodiments of the invention may be implemented using computing devices. FIG. 19 shows a diagram of a computing device in accordance with one or more embodiments of the invention. The computing device may include one or more computer processor(s) (1902), non-persistent storage (1904) (e.g., volatile memory, such as random access memory (RAM), cache memory), persistent storage (1906) (e.g., a hard disk, an optical drive such as a compact disk (CD) drive or digital versatile disk (DVD) drive, a flash memory, etc.), a communication interface (1912) (e.g., Bluetooth interface, infrared interface, network interface, optical interface, etc.), input devices (1910), output devices (1908), and numerous other elements (not shown) and functionalities. Each of these components is described below.

In one embodiment of the invention, the processor(s) (1902) may be an integrated circuit for processing instructions. For example, the computer processor(s) may be one or more cores or micro-cores of a processor. The computing device may also include one or more input devices (1910), such as a touchscreen, keyboard, mouse, microphone, touchpad, electronic pen, or any other type of input device. Further, the communication interface (1912) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the invention, the computing device may include one or more output devices (1908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1902), non-persistent storage (1904), and persistent storage (1906). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to enable the computer processor to perform one or more embodiments described herein.

The problems discussed above should be understood as being examples of problems solved by embodiments of the invention disclosed herein and the invention should not be limited only to solving the same/similar problems. The disclosed invention is broadly applicable to address a range of problems beyond those discussed herein.

Specific embodiments are described with reference to the accompanying figures. In the above description, numerous details are set forth as examples of the invention. It will be understood by those skilled in the art, that one or more embodiments of the present invention may be practiced without these specific details, and that numerous variations or modifications may be possible without departing from the scope of the invention. Certain details known to those of ordinary skill in the art are omitted to avoid obscuring the description.

In the prior description of the figures, any component described with regard to a figure, in various embodiments of the invention, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of forming query optimized representations (QORs), comprising:
normalizing enterprise data received at an enhanced distributed retrieval augmented generation (RAG) system, wherein:
the enhanced distributed RAG system is located on a distributed edge site of a plurality of distributed edge sites,
each distributed edge site of the plurality of distributed edge sites has a different enhanced distributed RAG system of a plurality of enhanced distributed RAG systems, and
the plurality of distributed edge sites are connected to a centralized system and the centralized system comprises a global federated RAG module;
extracting relevant information from the enterprise data;
chunking the relevant information into relevant information parts;
performing semantic tagging of the relevant information parts;
creating a local QORs of the relevant information parts;
transmitting the relevant information, the relevant information parts, semantic tagging data, and the local QORs to a local data cache of a distributed data management system connected to the enhanced distributed RAG system;
transmitting the local QORs to the global federated RAG module; and
transmitting the local QORs to a local small foundation system in response to a first query received at the local small foundation system, wherein the local QORs is used to form prompts based on the first query for a generative artificial intelligence model.

2. The method of claim 1, further comprising:
receiving global QORs from the global federated RAG module; and
transmitting the global QORs to the local small foundation system in response to the first query received at the local small foundation system, wherein the global QORs is used to form the prompts based on the first query for the generative artificial intelligence model.

3. The method of claim 2, wherein the global QORs are transmitted to the global federated RAG module from a different enhanced distributed RAG system in a different distributed edge site of the plurality of distributed edge sites.

4. The method of claim 1, further comprising:
receiving web based QORs from a web database; and
transmitting the web based QORs to the local small foundation system in response to the first query received at the local small foundation system, wherein the web based QORs are used to form the prompts based on the first query for the generative artificial intelligence model.

5. The method of claim 1, wherein:
the local QORs are assessed to be suitable for central storage by the global federated RAG module;
the local QORs are generated into global QORs and stored at the global federated RAG module; and
the global QORs are accessible by all enhanced distributed RAG systems of the plurality of enhanced distributed RAG systems.

6. The method of claim 1, further comprising:
receiving, from the local small foundation system, a request for relevant information corresponding to the local QORs; and
transmitting the relevant information to the local small foundation system.

7. The method of claim 1, wherein the local small foundation system uses the prompts based on the first query to form classification results and the classification results are used to form enterprise data in a knowledge acquirer which are transmitted to the enhanced distributed RAG system.

8. The method of claim 1, wherein the local small foundation system has less than 10 billion parameters.

9. A non-transitory computer readable medium comprising computer readable program code, which when executed by a computer processor enables the computer processor to perform a method of forming query optimized representations (QORs), comprising:
normalizing enterprise data received at an enhanced distributed retrieval augmented generation (RAG) system, wherein:
the enhanced distributed RAG system is located on a distributed edge site of a plurality of distributed edge sites,
each distributed edge site of the plurality of distributed edge sites has a different enhanced distributed RAG system of a plurality of enhanced distributed RAG systems, and
the plurality of distributed edge sites are connected to a centralized system and the centralized system comprises a global federated RAG module;
extracting relevant information from the enterprise data;
chunking the relevant information into relevant information parts;
performing semantic tagging of the relevant information parts;
creating a local QORs of the relevant information parts;
transmitting the relevant information, the relevant information parts, semantic tagging data, and the local QORs to a local data cache of a distributed data management system connected to the enhanced distributed RAG system;
transmitting the local QORs to the global federated RAG module; and
transmitting the local QORs to a local small foundation system in response to a first query received at the local small foundation system, wherein the local QORs is used to form prompts based on the first query for a generative artificial intelligence model.

10. The non-transitory computer readable medium of claim 9, further comprising:
receiving global QORs from the global federated RAG module; and
transmitting the global QORs to the local small foundation system in response to the first query received at the local small foundation system, wherein the global QORs is used to form the prompts based on the first query for the generative artificial intelligence model.

11. The non-transitory computer readable medium of claim 10, wherein the global QORs are transmitted to the global federated RAG module from a different enhanced distributed RAG system in a different distributed edge site of the plurality of distributed edge sites.

12. The non-transitory computer readable medium of claim 9, further comprising:
receiving web based QORs from a web database; and
transmitting the web based QORs to the local small foundation system in response to the first query received at the local small foundation system, wherein the web based QORs are used to form the prompts based on the first query for the generative artificial intelligence model.

13. The non-transitory computer readable medium of claim 9, wherein:
the local QORs are assessed to be suitable for central storage by the global federated RAG module;
the local QORs are generated into global QORs and stored at the global federated RAG module; and
the global QORs are accessible by all enhanced distributed RAG systems of the plurality of enhanced distributed RAG systems.

14. The non-transitory computer readable medium of claim 9, further comprising:
receiving, from the local small foundation system, a request for relevant information corresponding to the local QORs; and
transmitting the relevant information to the local small foundation system.

15. The non-transitory computer readable medium of claim 9, wherein the local small foundation system uses the prompts based on the first query to form classification results and the classification results are used to form enterprise data in a knowledge acquirer which are transmitted to the enhanced distributed RAG system.

16. The non-transitory computer readable medium of claim 9, wherein the local small foundation system has less than 10 billion parameters.

17. A enhanced distributed retrieval augmented generation (RAG) system, comprising:
a processor;
storage comprising instructions, which when executed by the processor perform a method, the method comprising:

normalizing enterprise data received at an enhanced distributed RAG system, wherein:
- the enhanced distributed RAG system is located on a distributed edge site of a plurality of distributed edge sites,
- each distributed edge site of the plurality of distributed edge sites has a different enhanced distributed RAG system of a plurality of enhanced distributed RAG systems, and
- the plurality of distributed edge sites are connected to a centralized system and the centralized system comprises a global federated RAG module;

extracting relevant information from the enterprise data;
chunking the relevant information into relevant information parts;
performing semantic tagging of the relevant information parts;
creating a local QORs of the relevant information parts;
transmitting the relevant information, the relevant information parts, semantic tagging data, and the local QORs to a local data cache of a distributed data management system connected to the enhanced distributed RAG system;
transmitting the local QORs to the global federated RAG module; and
transmitting the local QORs to a local small foundation system in response to a first query received at the local small foundation system, wherein the local QORs is used to form prompts based on the first query for a generative artificial intelligence model.

18. The system of claim 17, further comprising:
receiving global QORs from the global federated RAG module; and
transmitting the global QORs to the local small foundation system in response to the first query received at the local small foundation system, wherein the global QORs is used to form the prompts based on the first query for the generative artificial intelligence model.

19. The system of claim 18, wherein the global QORs are transmitted to the global federated RAG module from a different enhanced distributed RAG system in a different distributed edge site of the plurality of distributed edge sites.

20. The system of claim 17, wherein:
- the local QORs are assessed to be suitable for central storage by the global federated RAG module;
- the local QORs are generated into global QORs and stored at the global federated RAG module; and
- the global QORs are accessible by all enhanced distributed RAG systems of the plurality of enhanced distributed RAG systems.

* * * * *